United States Patent
Zhang et al.

(10) Patent No.: US 12,316,859 B2
(45) Date of Patent: May 27, 2025

(54) APPARATUS, ARTICLES OF MANUFACTURE, AND METHODS FOR CLIPPING INDEX IDENTIFICATION IN ADAPTIVE LOOP FILTERING FOR VIDEO ENCODING

(71) Applicant: Intel Corporation, Santa Clara, CA (US)

(72) Inventors: Ximin Zhang, San Jose, CA (US); Yi-Jen Chiu, San Jose, CA (US); Keith Rowe, Shingle Springs, CA (US)

(73) Assignee: Intel Corporation, Santa Clara, CA (US)

( * ) Notice: Subject to any disclaimer, the term of this patent is extended or adjusted under 35 U.S.C. 154(b) by 650 days.

(21) Appl. No.: 17/553,449

(22) Filed: Dec. 16, 2021

(65) Prior Publication Data

US 2022/0109853 A1    Apr. 7, 2022

(51) Int. Cl.
| | | |
|---|---|---|
| *H04N 7/12* | (2006.01) | |
| *G06N 20/00* | (2019.01) | |
| *H04N 19/107* | (2014.01) | |
| *H04N 19/117* | (2014.01) | |
| *H04N 19/127* | (2014.01) | |
| *H04N 19/147* | (2014.01) | |

(52) U.S. Cl.
CPC ........... *H04N 19/147* (2014.11); *G06N 20/00* (2019.01); *H04N 19/107* (2014.11); *H04N 19/117* (2014.11); *H04N 19/127* (2014.11)

(58) Field of Classification Search
CPC .................................................... H04N 19/117
See application file for complete search history.

(56) References Cited

U.S. PATENT DOCUMENTS

| | | |
|---|---|---|
| 2021/0344922 A1 | 11/2021 | Zhang et al. |
| 2021/0344953 A1 | 11/2021 | Filippov et al. |
| 2021/0344964 A1 | 11/2021 | Drugeon et al. |

FOREIGN PATENT DOCUMENTS

| | | |
|---|---|---|
| WO | 2013059461 | 4/2013 |

OTHER PUBLICATIONS

Karczewicz et al., "VVC In-Loop Filters," IEEE Transactions on Circuits and Systems for Video Technology, vol. 31, No. 10, Oct. 2021, 19 pages.
Bross et al., "Versatile Video Coding Editorial Refinements on Draft 10," Joint Video Experts Team (JVET) U-T SG 16 WP 3 and ISO/IEC JTC 1/SC 29, 20th Meeting, by teleconference, Oct. 7-16, 2020, 512 pages.

*Primary Examiner* — Young Lee
(74) *Attorney, Agent, or Firm* — Hanley, Flight & Zimmerman, LLC

(57) ABSTRACT

Methods, apparatus, systems, and articles of manufacture are disclosed to improve video encoding. An example apparatus includes at least one memory, instructions, and processor circuitry to generate a pool of clipping index set candidates by executing a machine learning model, select a clipping index set from the pool of the clipping index set candidates based on a rate distortion cost associated with the clipping index set, the clipping index set including clipping coefficients, and filter a video frame based on the clipping coefficients.

24 Claims, 15 Drawing Sheets

| BitDepth | clipIdx | | | |
|---|---|---|---|---|
| | 0 | 1 | 2 | 3 |
| 8 | $2^8$ | $2^5$ | $2^3$ | $2^1$ |
| 9 | $2^9$ | $2^6$ | $2^4$ | $2^2$ |
| 10 | $2^{10}$ | $2^7$ | $2^5$ | $2^3$ |
| 11 | $2^{11}$ | $2^8$ | $2^6$ | $2^4$ |
| 12 | $2^{12}$ | $2^9$ | $2^7$ | $2^5$ |
| 13 | $2^{13}$ | $2^{10}$ | $2^8$ | $2^6$ |
| 14 | $2^{14}$ | $2^{11}$ | $2^9$ | $2^7$ |
| 15 | $2^{15}$ | $2^{12}$ | $2^{10}$ | $2^8$ |
| 16 | $2^{16}$ | $2^{13}$ | $2^{11}$ | $2^9$ |

FIG. 7

APPARATUS, ARTICLES OF MANUFACTURE, AND METHODS FOR CLIPPING INDEX IDENTIFICATION IN ADAPTIVE LOOP FILTERING FOR VIDEO ENCODING

FIELD OF THE DISCLOSURE

This disclosure relates generally to video encoding and, more particularly, to apparatus, articles of manufacture, and methods for clipping index identification in adaptive loop filter for video encoding.

BACKGROUND

In video compression/decompression (codec) systems, compression efficiency and video quality are important performance criteria. For example, visual quality is an important aspect of the user experience in many video applications. Compression efficiency impacts the amount of memory needed to store video files and/or the amount of bandwidth needed to transmit and/or stream video content. Encoding circuitry of a video codec system typically compresses video information so that more information can be sent over a given bandwidth or stored in a given memory space or the like. The compressed signal or data is then decoded by decoder circuitry of a receiving video codec that decodes or decompresses the signal or data for display to a user. In most examples, higher visual quality with greater compression is desirable.

BRIEF DESCRIPTION OF THE DRAWINGS

FIG. 7 is a table of example clipping parameters for different example clipping indices and example bit depths.

DETAILED DESCRIPTION

Figure 1:
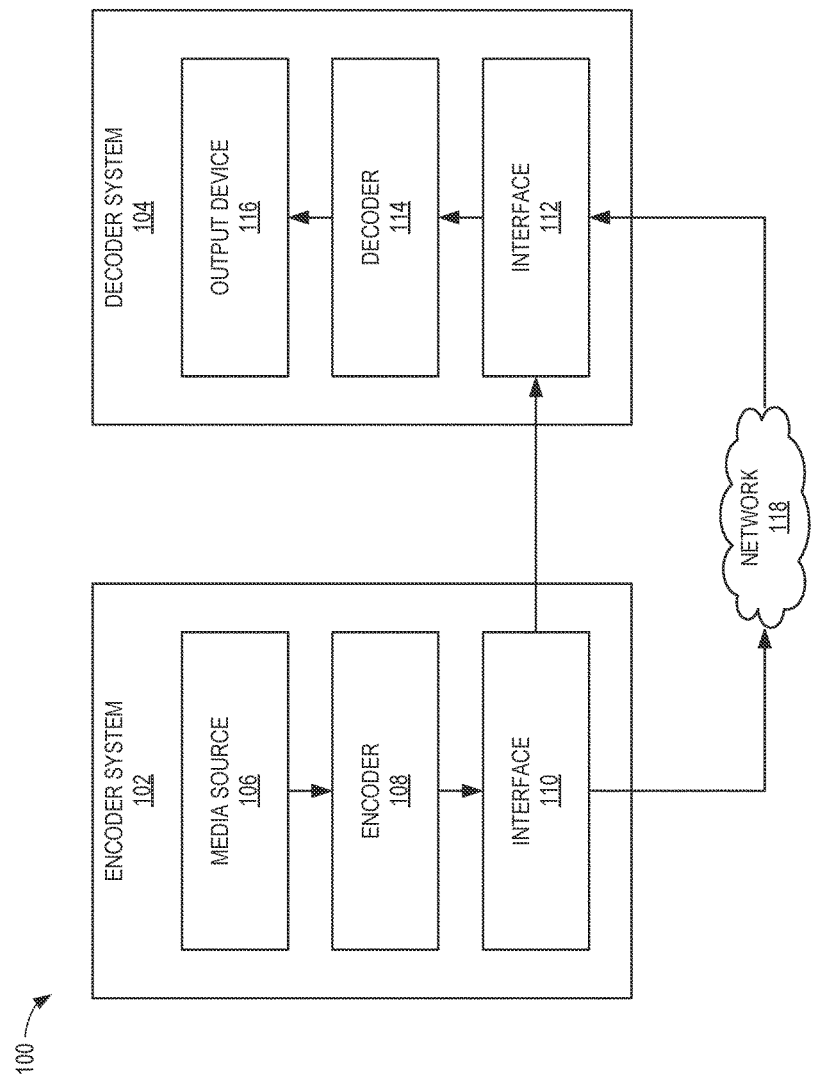
FIG. 1 is an illustration of an example video codec system, which includes an example encoder to compress video information to be provided to an example decoder system.

In general, the same reference numbers will be used throughout the drawing(s) and accompanying written description to refer to the same or like parts. The figures are not to scale.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein "substantially real time" refers to occurrence in a near instantaneous manner recognizing there may be real world delays for computing time, transmission, etc. Thus, unless otherwise specified, "substantially real time" refers to real time+/−1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

Video coding (e.g., video encoding and decoding) is incorporated in a wide range of digital video applications, which may include broadcast digital television, digital versatile disks (DVDs) and Blu-ray discs, real-time conversational applications such as video chat and conferencing, video capturing and editing systems, video transmission over internet and mobile networks, and the like. With increasing availability of high-resolution display devices (e.g., a device capable of presenting 4K resolution, 8K resolution, etc.), the amount of video data needed to depict even a relatively short duration video can be substantial, which may result in difficulties when the video data is to be communicated, streamed, transmitted, etc., across a network with limited bandwidth capacity. Generally, the video data is compressed before being transmitted across a network. At a source of the video data, video compression hardware, software, and/or firmware may code the video data prior to storage or transmission to decrease the quantity of video data needed to represent digital video images. At a destination for the video data, video decompression hardware, software, and/or firmware may decode the video data for presentation on a display device.

Some video compression techniques, such as those described in the standards defined by MPEG-2, MPEG-4, ITU-T H.263, ITU-T H.264/MPEG-4, Part 10, Advanced Video Coding (AVC), and High Efficiency Video Coding (HEVC) (H.265), may be utilized to transmit, receive, and store video data (e.g., digital video data or information) with improved efficiency. An evolution of such video compression techniques is Versatile Video Coding (VVC) (H.266). VVC is a video coding standard developed by the Joint Video Experts Team (WET) grouping experts from the ITU-T SG 16/Q.6 Video Coding Experts Group (VCEG) and the ISO/IEC JTC 1/SC 29/WG 11 Moving Pictures Experts Group (MPEG), which had also jointly developed the AVC and HEVC standards. Advantageously, VVC can achieve approximately 50% subject quality improvement with similar bitrates. Advantageously, VVC is designed to meet upcoming video compression/decompression needs.

VVC uses a block-based hybrid coding scheme that includes an encoding/decoding loop and in-loop filters. The filters are defined as "in-loop" because these filtering operations or techniques are applied inside the encoding/decoding loop prior to picture storage in a decoded picture buffer (DPB). For example, a video picture or frame may be transformed and quantized for entropy coding. In some such examples, the video picture or frame may be decoded with entropy decoding using context-adaptive binary arithmetic coding (CABAC), and followed by inverse quantization and inverse transform that results in decoded residue. In some examples, the residue is added to a prediction signal (e.g., a spatial (intra picture) prediction signal, a temporal (inter picture) prediction signal, or combination in case of combined intra-inter prediction (CIIP) mode). In some examples, the resulting reconstructed signal is then processed through the in-loop filters to generate a filtered picture or frame. The filtered picture or frame is stored in the DPB.

In VVC, pictures or frames are to be encoded are partitioned into Coding Tree Units (CTUs), which represent the basic coding processing units. In some instances, CTUs may consist of one or more Coding Tree Blocks (CTBs). In some examples, the maximum CTU size is defined by the largest CTB of the CTU (e.g., 128×128 samples, 256×256 samples, etc.). In some examples, a CTU can be recursively divided into CTBs, which can be recursively divided into Coding Units (CUs) according to three partitioning modes: quadtree (e.g., division into four equally sized CUs); ternary-tree (e.g., division into three CUs of size $¼^{th}$, $⅔^{th}$, $¼^{th}$); and Binary-Tree (e.g., Division into Two Equally Sized CUs). In Some examples, additional partitioning can arise where a CU is split into Transform Units (TUs) of smaller size than the CU size.

In some instances, the quantization, transform, and/or partitioning operations of a block-based hybrid coding scheme, such as that utilized in VVC as described above, may cause, generate, and/or otherwise introduce coding artifacts such as block discontinuities, mosquito noise, ringing artifacts, or texture and edge smoothing. The in-loop filters may be applied in the VVC encoding and decoding loops to reduce these artifacts. In VVC, four different in-loop filters are specified: a Deblocking Filter (DBF) for reducing the blocking artifacts, a Sample Adaptive Offset (SAO) filter for attenuating the ringing artifacts and correcting the local average intensity changes, and Adaptive Loop Filters (ALFs) and Cross-Component Adaptive Loop Filters (CC-ALFs) for further correcting the video signal based on linear filtering and adaptive clipping.

Generally, a video is a sequence of images (also referred to as frames) that is captured and eventually displayed at a given frequency. In some examples, an image can be obtained by stopping the video at a specific frame of the sequence. In some examples, a picture is the same as a frame. In some examples, such as when an intra-frame coding system is not applied to each individual frame, a picture is different from a frame. For example, a first image to be encoded using an intra-frame coding system can be identified as an intra-coded picture (also referred to as an I-picture). In some such examples, a second image to be encoded using an inter-frame coding system can be identified as an inter-coded frame. For example, an inter-coded frame can be a bidirectional frame (also referred to as a B-frame) or a predicted frame (also referred to as a P-frame). In some disclosed examples, I-pictures are images that are coded by using information present only in the image itself and without depending on information from other images. P-frames are images that are coded using information corresponding to changes between the image and a previous image (e.g., an I-picture, a previous P-frame, etc.). B-frames are images that are coded using information corresponding to differences between the current image and both the preceding and following images (e.g., a previous and following P-frame, a previous I-picture and a following P-frame, etc.). The order in which the I-image(s), P-frame(s), and B-frame(s) are encoded and/or otherwise arranged is called the group of pictures (GOP).

An image (e.g., a video picture, a video frame, etc.) includes video data, which can include pixel data. Pixel data can include luminance data and/or chrominance data. For example, luminance or luma can represent the brightness in an image. Chrominance or chroma can represent the color in an image. As used herein, the terms "frame" and "video frame" are interchangeable.

An ALF is an adaptive filter that is typically applied to reduce the mean square error (MSE) between an original and reconstructed sample using Wiener-based filtering. For example, an ALF can be applied to luma samples and/or chroma samples of a frame. In some examples, an ALF includes a luma Wiener filter (e.g., a luma ALF), a chroma Wiener filter (e.g., a chroma ALF), a CC-ALF, and non-linear clipping. In some examples, an ALF includes a classification of non-overlapping 4×4 blocks based on their local sample gradients. In some examples, a specific filter for each class can be applied among the different filters signaled in the bitstream output from the encoder. In some examples, based on this classification, geometric transformation (e.g., a 90-degree rotation, diagonal or vertical flip) of coefficients (e.g., filter coefficients) within a filter shape of the filter can be applied.

For each image, the image level filter sets are derived. In response to deriving the filter sets at the image level, a block level decision is made for each CTU (e.g., a decision is made at the block level of the image). In some examples, the luma Wiener filter can be implemented using a 7×7 diamond shape symmetric filter with 13 filter coefficients. Each filter set can have up to 25 filters that respectively correspond to 25 difference classes. In some examples, the chroma Wiener filter can be implemented using a 5×5 diamond shape symmetric filter with 7 filter coefficients and each filter set can have up to 8 filters. In some examples, each filter coefficient in the luma and chroma Wiener filters can have a clipping parameter to be signaled to reduce the excessive filtering impact of neighbor pixels in a frame to be processed. In some examples, the clipping parameter can be one of 4 options (e.g., a first option corresponding to a first clipping index, a second option corresponding to a second clipping index, etc.). For example, to enable an ALF filter to take into consideration both value similarity and spatial relationship between samples (e.g., luma samples, chroma samples, etc.), clipping can be applied to clip the difference between the neighboring sample value and the current to-be-filtered sample.

In some examples, a CC-ALF exploits the correlation between the luma and chroma samples and applies only to the chroma samples. For example, a CC-ALF can generate a correction of chroma samples using a linearly filtered version of the luma samples located around the same relative location as the chroma samples. In some examples, a CC-ALF filter can be implemented using a 3×4 diamond filter using 8 filter coefficients and each filter set can have up to 4 filters.

The complexity of encoder image level filter derivation and block level decision is substantial due to the numerous candidate filters to be analyzed to identify the final filter decision for an image of interest, as well as due to the non-linear clipping indices to be determined, which can have a substantial number of variations. For example, in a VVC standard reference encoder, non-linear clipping index determination can increase the complexity of the ALF by approximately 10 times. In some examples, in a VVC standard reference encoder with non-linear clipping determination, the memory requirement to derive the image level statistics or parameters and calculate the rate distortion cost of thousands (or more) of candidate filters to find the final filter decision is approximately 16 times higher with respect to prior encoders without non-linear clipping index determination. In some examples, the statistics or parameters can include chroma and/or luma values of pixels (e.g., pixel data of one or more pixels) of the image.

Examples disclosed herein include systems, apparatus, articles of manufacture, and methods for clipping index identification in adaptive loop filtering for video encoding. Examples disclosed herein reduce complexity and improve efficiency of ALFs for VVC video encoding. In some disclosed examples, an ALF filter adapted to effectuate non-linear clipping can determine a relatively small number of clipping index combinations based on frame level quantization parameters (QPs) and frame content analysis. In some disclosed examples, a machine learning model can be trained and executed to determine the relatively small number of clipping index combinations. In some disclosed examples, an ALF filter can implement a low-complexity non-linear clipping index determination technique by identifying one or two pre-selected clipping index combinations based on priority and selecting one of the one or two pre-selected clipping index combinations. For example, the low-complexity non-linear clipping index determination technique can achieve a gain in BD-rate (e.g., a gain of 0.6% BD-rate gain, a gain of 1.0% BD-rate gain, etc.), a reduction in complexity (e.g., a 25%, 28%, 30%, etc., complexity reduction), and/or a reduction in memory requirements (e.g., a 75%, 78%, 80%, etc., reduction in memory requirements) with respect to prior encoders.

In some disclosed examples, an ALF filter can implement a high-quality non-linear clipping index determination technique by selecting one of the relatively small number of pre-selected clipping index combination candidates. For example, the high-quality non-linear clipping index determination technique can achieve a gain in BD-rate (e.g., a 1.1%, 1.5%, etc., BD-rate gain), a reduction in complexity (e.g., a 4%, 5%, 6%, etc., complexity reduction), and/or a reduction in memory requirements (e.g., a 6.25%, 7%, 8%, etc., reduction in memory requirements) with respect to prior encoders.

Advantageously, searching such a relatively small number of pre-selected clipping index combination candidates for a set of clipping index values can enable parallel multi-threading to improve the efficiency and reduce the runtime needed for determining which clipping index combination to utilize. Advantageously, examples disclosed herein can substantially reduce the filter derivation complexity and the memory requirements to implement ALF.

FIG. 1 is an illustration of an example video codec system 100, which includes an example encoder system 102 and an example decoder system 104. The encoder system 102 of the illustrated example encodes and/or otherwise compresses video information to be provided to the decoder system 104. In the illustrated example, the encoder system 102 includes an example media source 106, an example encoder 108, and a first example interface 110. In the illustrated example, the decoder system 104 includes a second example interface 112, an example decoder 114, and an example output device 116. In some examples, the first interface 110 and the second interface 112 are directly and/or otherwise directly in communication with each other. In some examples, the first interface 110 and the second interface 112 are communicatively coupled to each other by way of an example network 118.

The media source 106 of the illustrated example corresponds to any one or more media provider(s) capable of providing media for presentation on an output device, such as the output device 116 of the decoder system 104. In some examples, the media provided by the media source 106 can be any type(s) of media, such as audio, video, multimedia, etc. Additionally, the media can correspond to advertisements, live media, streaming media, broadcast media, stored media, on-demand content, etc.

In some examples, the media source 106 can be implemented by (i) an image capturing device of any kind, such as a camera for capturing a real-world image, (ii) an image generating device of any kind, for example a graphics processor for generating a computer animated image, (iii) any other kind of other device for obtaining and/or providing a real-world image, a computer generated image (e.g., a screen content, a virtual reality (VR) image), and/or (iv) any combination(s) thereof (e.g., an augmented reality (AR) image). In some examples, the media source 106 can be implemented by any kind and/or quantity of memory or mass storage device for storing any of the aforementioned images.

The encoder 108 of the illustrated example can be implemented by hardware, software, and/or firmware to encode and/or otherwise output encoded video data. For example, the encoder 108 can be implemented using processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs).

In some examples, the encoder 108 can receive video data (e.g., video including one or more images) from the media source 106 and carry out pre-processing on the video data to generate pre-processed video data. For example, the encoder 108 can execute color format conversion (e.g., from RGB color format to YCbCr color format), color correction, de-noising, and/or trimming on the video data. In some examples, the encoder 108 can encode video data from the media source 106 (e.g., the pre-processed video data) using VVC. For example, the encoder 108 can process (e.g., by compression) original media images from the media source 106 to reduce the amount of data required for representing the video images (e.g., for more efficient storage and/or transmission) by utilizing VVC.

The first interface 110 of the illustrated example can be implemented by hardware, software, and/or firmware to receive encoded video data from the encoder 108 and to transmit the encoded video data to the second interface 112 (e.g., either directly or by way of the network 118). The second interface 112 of the illustrated example can be implemented by hardware, software, and/or firmware to receive encoded video data from the first interface 110 and provide the encoded video data to the decoder 114.

In some examples, the first interface 110 and/or the second interface 112 obtain information from and/or transmit information to the network 118. In the illustrated example, the first interface 110 can implement a server (e.g., a web server) that transmits encoded video data to the second interface 112. In the illustrated example, the second interface 112 can implement a server (e.g., a web server) that receives the encoded video data from the first interface 110. In the illustrated example, the encoded video data is formatted as one or more HTTP messages. However, any other message format and/or protocol may additionally or alternatively be used such as, for example, a file transfer protocol (FTP), a simple message transfer protocol (SMTP), an HTTP secure (HTTPS) protocol, etc.

In some examples, the first interface 110 and/or the second interface 112 can be implemented using processor circuitry, analog circuit(s), digital circuit(s), logic circuit(s), programmable processor(s), programmable microcontroller(s), GPU(s), DSP(s), ASIC(s), PLD(s), and/or FPLD(s). In some examples, the first interface 110 and/or the second interface 112 can be implemented using interface circuitry. For example, the interface circuitry can be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface. In some examples, the first interface 110 and/or the second interface 112 can be implemented using a communication device such as a transmitter, a receiver, a transceiver, a modem, a residential gateway, a wireless access point, and/or a network interface to facilitate exchange of data with external machines (e.g., computing devices of any kind) by the network 118. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The network 118 of the illustrated example is the Internet. However, the network 118 can be implemented using any suitable wired and/or wireless network(s) including, for example, one or more data buses, one or more Local Area Networks (LANs), one or more wireless LANs (WLANs), one or more cellular networks, one or more private networks, one or more public networks, etc. The network 118 enables the first interface 110, and/or, more generally, the encoder system 102, to be in communication with the second interface 112, and/or, more generally, the decoder system 104.

The decoder 114 of the illustrated example can be implemented by hardware, software, and/or firmware to receive and decode encoded video data to provide decoded video data to the output device 116. For example, the decoder 114 can be implemented using processor circuitry, analog circuit(s), digital circuit(s), logic circuit(s), programmable processor(s), programmable microcontroller(s), GPU(s), DSP(s), ASIC(s), PLD(s), and/or FPLD(s). In some examples, the decoder 114 can decode encoded video data using VVC. In some examples, the decoder 114 can post-process the decoded video data (also referred to herein as reconstructed video data). For example, the decoder 114 can perform post-processing operations such as color format conversion (e.g., from YCbCr color format to RGB color format), color correction, re-sampling, trimming, etc., or any other type of processing the decoded video data for display, presentation, etc., by the output device 116.

The output device 116 of the illustrated example can be implemented by hardware, software, and/or firmware to receive the decoded video data (e.g., the post-processed decoded video data) for displaying and/or otherwise presenting the video (e.g., to a user or viewer). In some examples, the output device 116 can be one or more display devices of any kind, such as an integrated or external display for representing the decoded video data. In some examples, the output device 116 can be implemented using one or more liquid crystal displays (LCDs), organic light emitting diode (OLED) displays, plasma displays, projectors, micro light emitting diode (LED) displays, liquid crystal on silicon (LCoS) displays, digital light processor (DLP) displays, or any other kind of display or output device.

Although the illustrated example of FIG. 1 depicts the encoder system 102 and the decoder system 104 as separate devices, examples of devices and/or systems described herein may also include both or both functionalities (e.g., the encoder system 102 or corresponding functionality and the decoder system 104 or corresponding functionality). In some examples, the encoder system 102 or corresponding functionality and the decoder system 104 or corresponding functionality may be implemented using the same hardware, software, and/or firmware or by separate hardware, software, and/or firmware or any combination thereof.

In some examples, the encoder system 102 and the decoder system 104 may be implemented using any of a wide range of devices, including any kind of handheld or stationary devices, such as notebook or laptop computers, mobile phones, smart phones, tablets or tablet computers, cameras, desktop computers, set-top boxes, televisions, display devices, digital media players, video gaming consoles, video streaming devices (e.g., content services servers or content delivery servers), broadcast receiver devices, broadcast transmitter devices, or the like and may use no operating system or any kind of operating system. In some examples, the encoder system 102 and the decoder system 104 may be configured and/or otherwise equipped for wireless communication. For example, the encoder system 102 and the decoder system 104 can be wireless communication devices.

The video codec system 100 is merely an example and the techniques described herein may apply to video coding settings (e.g., video encoding or video decoding) that do not necessarily include any data communication between the encoder 108 (or encoder system 102) and the decoder 114 (or decoder system 104). In some examples, data (e.g., video data) is retrieved from a local memory (or local mass storage device), streamed over the network 118, or the like. For example, the encoder 108 can encode and store data to memory (or mass storage device), and/or the decoder 114 can retrieve and decode data from the memory (or the mass storage device). In some examples, the encoding and decoding is performed by devices that do not communicate with one another, but simply encode data to memory (or mass storage device) and/or retrieve and decode data from the memory (or the mass storage device).

Figure 2:
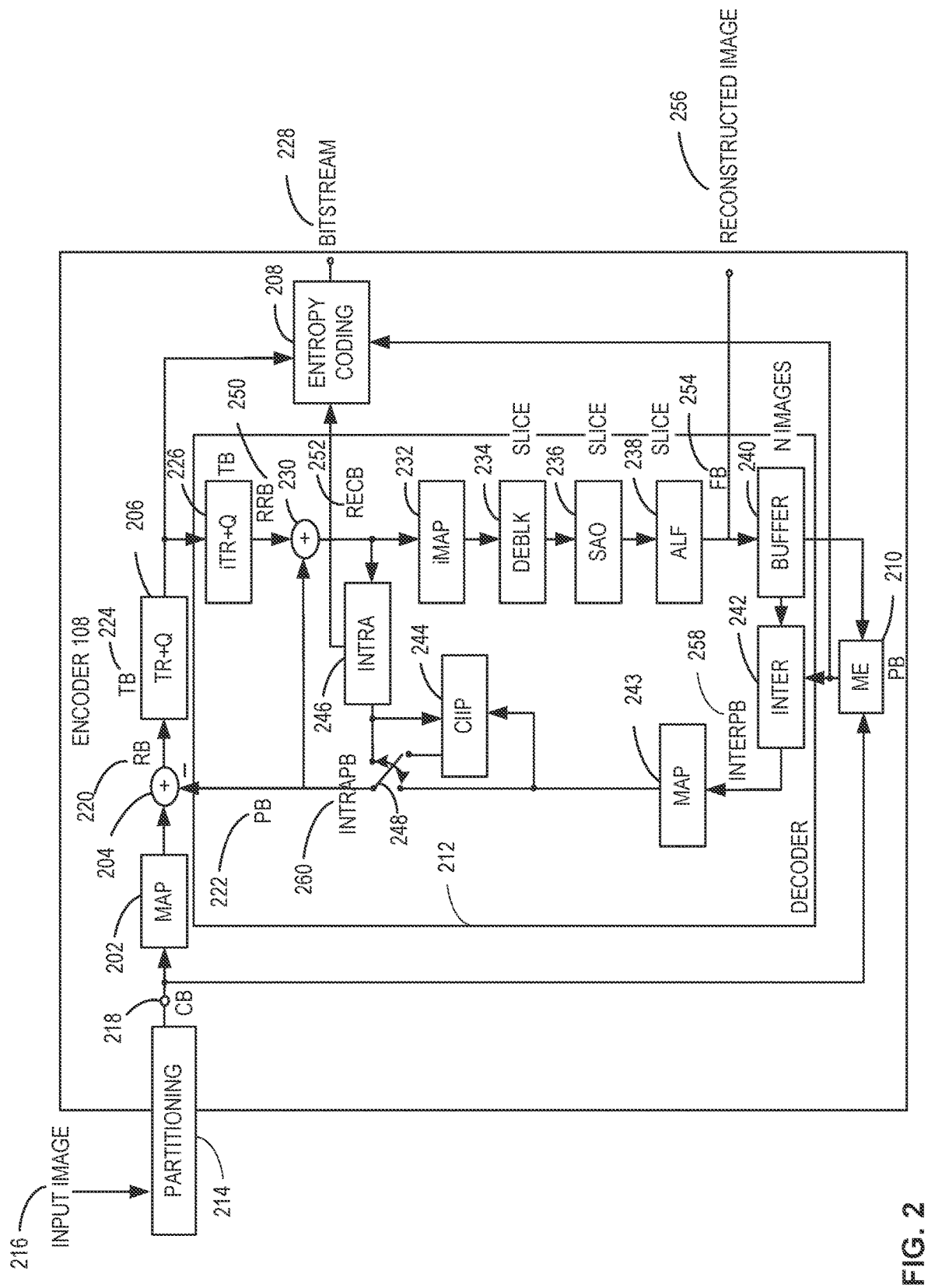
FIG. 2 is a block diagram of an example implementation of the encoder of FIG. 1, which includes an example adaptive loop filter.

FIG. 2 is a block diagram of an example implementation of the encoder 108 of FIG. 1. In some examples, the encoder 108 can implement a VVC encoder. The encoder 108 of the illustrated example of FIG. 2 includes a first example map block 202, an example residual calculation block 204, an example transform and quantization block 206 (identified by TR+Q), an example entropy coding block 208, an example motion estimation block 210 (identified by ME), and an example decoder 212. In example operation, the encoder 108 performs encoding (e.g., VVC encoding) by predicting the next frame and sending corrections of the next frame with the next frame. In the illustrated example, the encoder 108 includes the decoder 212 to determine what is decoded and understand the differences between an input (e.g., a frame to be encoded) and output (e.g., an encoded frame) of the encoder 108. In the illustrated example, the encoder 108 generates the corrections of the next frame based on the differences between the input and the output of the encoder 108.

An example partitioning block 214 is coupled to the first map block 202. In some examples, the partitioning block 214 executes high-level partitioning of an example input image 216 into subimages, slices, tiles, etc. In some examples, the partitioning block 214 executes block partitioning of pixels of the subimages, the slices, the tiles, etc., into Coding Tree Units (CTUs) (e.g., a CTU up to 128×128 pixels, 256×256 pixels, etc.) and Coding Units through a multi-type tree (MTT) (e.g., a quad-tree, a vertical or horizontal ternary-tree, a vertical or horizontal binary-tree, etc.). In some examples, the partitioning block 214 can separate trees for luma and chroma components.

In example operation, the partitioning block 214 receives the input image 216 and partitions the input image 216 into one or more example coding blocks such as an example coding block 218 (identified by CB) depicted in FIG. 2. For example, the partitioning block 214 can receive the input image 216 from the media source 106 of FIG. 1. As used herein, the term "block" may be a portion, in particular a square or rectangular portion, of an image (e.g., a picture). With reference, for example, to VVC, the block may be or correspond to a coding tree unit (CTU), a coding unit (CU), a prediction unit (PU), and transform unit (TU) and/or to the corresponding blocks, e.g. a coding tree block (CTB), a coding block (CB), a transform block (TB) or prediction block (PB). Correspondingly, a CTB may be an N×N block of samples for some value of N such that the division of a component into CTBs is a partitioning. A CU may be or include a coding block of luma samples, two corresponding coding blocks of chroma samples of an image that has three sample arrays, or a coding block of samples of a monochrome image or an image that is coded using three separate color planes and syntax structures used to code the samples. Correspondingly a CB may be an M×N block of samples for some values of M and N such that the division of a CTB into coding blocks is a partitioning.

In some examples, such as those according to VVC, a combined quad-tree and binary tree (QTBT) partitioning is for example used to partition a coding block, such as the coding block 218 depicted in FIG. 2. In the QTBT block structure, a CU can have either a square or rectangular shape. For example, a CTU is first partitioned by a quadtree structure. The quadtree leaf nodes are further partitioned by a binary tree or ternary (or triple) tree structure. The partitioning tree leaf nodes are called CUs, and that segmentation is used for prediction and transform processing without any further partitioning. This means that the CU, PU, and TU have the same block size in the QTBT coding block structure. In parallel, multiple partition, for example, triple tree partition may be used together with the QTBT block structure.

The first map block 202 can perform luma mapping on the coding block 218. For example, the first map block 202 can remap the luma code values of the coding block 218. In some examples, the first map block 202 can execute chroma scaling to allow flexible adjustment between luma and chroma signals. The residual calculation block 204 determines an example residual block 220 (identified by RB) (also referred to as residue, residual, or a residual value) based on the coding block 218 and an example prediction block 222 (identified by PB), which is output from the decoder 212. For example, the residual calculation block 204 can determine the residual block 220 based on a difference between sample values of the coding block 218 and sample values of the prediction block 222 on a sample by sample basis (e.g., a pixel by pixel basis) to obtain the residual block 220 in the sample domain.

The transform and quantization block 206 can receive the residual block 220 (or the coding block 218) and generate an example transform block 224 (identified by TB). For example, the transform and quantization block 206 can apply a transform (e.g., a discrete cosine transform (DCT), a discrete sine transform (DST), etc.) on the sample values of the residual block 220 to obtain transform coefficients in the transform domain. The transform coefficients may also be referred to as transform residual coefficients and represent the residual block 220 in the transform domain.

In some examples, the transform and quantization block 206 can be configured to apply integer approximations of DCT/DST, such as the transforms specified for VVC. In some examples, compared to an orthogonal DCT transform, such integer approximations are typically scaled by a certain factor. For example, to preserve the norm of the residual block 220, which is processed by forward and inverse transforms, additional scaling factors can be applied as part of the transform process. In some examples, the scaling factors can be chosen based on certain constraints like scaling factors being a power of two for shift operations, bit depth of the transform coefficients, tradeoff between accuracy and implementation costs, etc. Specific scaling factors are, for example, specified for the inverse transform (e.g., by inverse transform and quantization block 226) and corresponding scaling factors for the forward transform (e.g., by the transform and quantization block 206) can be specified accordingly.

In some examples, the transform and quantization block 206 can be configured to output transform parameters. For example, the transform parameters can define, indicate, represent, etc., a type of transform or transforms. In some examples, the transform and quantization block 206 can provide the transform parameters directly to a decoder (e.g., the decoder 114 of FIG. 1). In some examples, the transform and quantization block 206 can provide the transform parameters to be encoded or compressed via the entropy coding block 208 so that the decoder can receive and use the transform parameters for decoding.

In some examples, the transform and quantization block 206 can be configured to quantize the transform coefficients to obtain quantized coefficients. For example, the transform and quantization block 206 can quantize the transform coefficients by applying scalar quantization or vector quantization. The quantized coefficients may also be referred to as quantized transform coefficients or quantized residual coefficients.

The entropy encoding block 208 can be configured to apply, for example, an entropy encoding algorithm or scheme (e.g., a variable length coding (VLC) scheme, a context adaptive VLC (CAVLC) scheme, an arithmetic coding scheme, a binarization, context adaptive binary arithmetic coding (CABAC), syntax-based context-adaptive binary arithmetic coding (SBAC), probability interval partitioning entropy (PIPE) coding or another entropy encoding methodology or technique) or bypass (no compression) on the quantized coefficients, inter prediction parameters, intra prediction parameters, loop filter parameters, and/or other syntax elements to obtain encoded image data, which can be output from the entropy coding block 208 in the form of an example bitstream 228 (e.g., an encoded bitstream), so that, e.g., the decoder 114 of FIG. 1, can receive and use the parameters for decoding. The bitstream 228 can be transmitted to a decoder, such as the decoder 114 of FIG. 1, or stored in memory for later transmission or retrieval by the decoder.

The decoder 212 of the illustrated example generates the prediction block 222 based on the transform block 224 to correct coding artifacts such as block discontinuities, mosquito noise, ringing artifacts, or texture and edge smoothing. The decoder 212 of the illustrated example includes the inverse transform and quantization block 226 (identified by iTR+iQ), an example reconstruction block 230, an example inverse map block 232 (identified by iMap), an example deblocking filter 234 (identified by DEBLK), an example Sample Adaptive Offset (SAO) filter 236 (identified by SAO), an example Adaptive Loop Filtering (ALF) filter 238 (identified by ALF), an example buffer 240, an example inter prediction mode block 242 (identified by INTER), a second example map block 243 (identified by MAP), an example Combined Inter and Intra Prediction (CIIP) mode block 244 (identified by CIIP), an example intra prediction mode block 246 (identified by INTRA), and an example switch 248.

The inverse transform and quantization block 226 can be configured to apply the inverse quantization of the transform and quantization block 206. For example, the inverse transform and quantization block 226 can apply the inverse quantization on the quantized coefficients from the transform and quantization block 206 to generate dequantized coefficients. In some examples, the inverse transform and quantization block 226 can generate the dequantized coefficients by applying the inverse quantization scheme applied by the transform and quantization block 206 based on or using the same quantization step size as the transform and quantization block 206. For example, the inverse transform and quantization block 226 can execute inverse quantization by multiplying quantized coefficients from the transform and quantization block 206 by a quantization step size. The dequantized coefficients may also be referred to as dequantized residual coefficients. In some examples, the dequantized coefficients can correspond to the transform coefficients but may not be identical due to the loss by quantization.

The inverse transform and quantization block 226 can be configured to apply the inverse transform of the transform applied by the transform and quantization block 206. For example, the inverse transform and quantization block 226 can perform an inverse DCT, an inverse DST, or other inverse transform to generate an example reconstructed residual block 250 (identified by RRB) (or corresponding dequantized coefficients) in the sample domain. The reconstructed residual block 250 may also be referred to as a transform block.

The reconstruction block 230 can be implemented by an adder or summer to add the reconstructed residual block 250 to the prediction block 222 to obtain an example reconstructed block 252 (identified by RECB) in the sample domain. For example, the reconstruction block 230 can add (e.g., add sample-by-sample) the sample values of the reconstructed residual block 250 and the sample values of the prediction block 222 to yield the reconstructed block 252.

The inverse map block 232 can perform an inverse luma mapping of the reconstructed block 252 and output the result to the deblocking filter 234. In the illustrated example, the deblocking filter 234, the SAO filter 236, and/or the ALF filter 238 can be configured to filter the reconstructed block 252 to generate an example filtered block 254 (identified by FB). In some examples, the filtered block 254 can implement an example reconstructed image 256. The deblocking filter 234 can reduce blocking artifacts in a slice of the reconstructed block 252. The SAO filter 236 can filter for attenuating the ringing artifacts and correcting the local average intensity changes. The ALF filter 238, which can be implemented by a luma ALF filter, a chroma ALF filter, and/or a CC-ALF filter, can further correct the video signal based on linear filtering and adaptive clipping. The ALF filter 238 can generate and/or otherwise output the filtered block 254, the reconstructed image 256, etc., which can be provided to the buffer 240. In some examples, the ALF filter 238 can generate and/or otherwise output loop filter parameters (e.g., a filter index, filter coefficients, etc.) either directly to a decoder, such as the decoder 114 of FIG. 1, or to the entropy coding block 208 for insertion into the bitstream 228.

The buffer 240 of the illustrated example is a decoded image buffer. In some examples, the buffer 240 may be referred to as a decoded picture buffer (DPB). In some examples, the buffer 240 can be implemented using memory, one or more mass storage devices, etc., that store(s) reference images, and/or, more generally, reference image data, for encoding video data by the encoder 108. For example, the buffer 240 can be configured to store one or more of the filtered blocks 254. In some examples, the buffer 240 can be adapted to store other previously filtered blocks, such as previously reconstructed and filtered blocks, of the same current image or of different images, such as previously reconstructed images. In some examples, the buffer 240 can provide complete previously reconstructed (e.g., decoded) images (and corresponding reference blocks and samples) and/or a partially reconstructed current image (and corresponding reference blocks and samples) to the inter prediction mode block 242 for inter prediction.

The motion estimation block 210 of the illustrated example can be configured to receive or obtain the coding block 218 from the partitioning block 214 and receive or obtain an image, such as the filtered block 254, from the buffer 240. The motion estimation block 210 can perform motion estimation of images in a video sequence, such as the current image and a previously decoded image. For example, the motion estimation block 210 can select a reference block from a plurality of reference blocks of the same or different images of the plurality of other images and provide a reference image (or reference image index) and/or an offset (spatial offset) between the position (x, y coordinates) of the reference block and the position of the current block as inter prediction parameters to the inter prediction mode block 242. The offset may be referred to as a motion vector.

The inter prediction mode block 242 of the illustrated example can be configured to receive or obtain an inter prediction parameter from the motion estimation block 210 and to perform inter prediction based on or using the inter prediction parameter to generate an example inter prediction block 258 (identified by INTERPB). For example, the inter prediction mode block 242 can perform inter prediction by creating a prediction model from one or more previously encoded images, frames, etc. In some examples, inter prediction can exploit temporal redundancy, such as correlation among pixels between neighboring images, by calculating prediction values through extrapolation from already coded pixels for effective delta coding. The second map block 243 can be configured to receive the inter prediction block 258 and perform luma mapping on the inter prediction block 258. The second map block 243 can output the inter prediction block 258 to the CIIP mode block 244 and the switch 248.

The intra prediction mode block 246 can be configured to use reconstructed samples of neighboring blocks of the same current image to generate an example intra prediction block 260 (identified by INTRAPB). For example, the intra prediction mode block 246 can perform intra prediction by creating a prediction model from pixels within an image, a frame, etc. In some examples, intra prediction can exploit spatial redundancy, such as correlation among pixels within one frame, by calculating prediction values through extrapolation from already coded pixels for effective delta coding. In some examples, the intra prediction mode block 246 can be adapted to output intra prediction parameters to the entropy coding block 208 for inclusion into the bitstream 228 so that a decoder, such as the decoder 114, can receive and use the intra prediction parameters for decoding.

In some examples, the decoder 212 can be configured to operate using inter prediction (e.g., operate in an inter prediction mode), intra prediction (e.g., operate in an intra prediction mode), or a combination thereof. For example, in response to configuring the decoder 212 to use inter prediction, the decoder 212 can control the switch 248 to couple an output of the second map block 243 to the residual calculation block 204 through the switch 248. In some such examples, the inter prediction block 258 output from the second map block 243 can implement the prediction block 222.

In some examples, in response to configuring the decoder 212 to use intra prediction, the decoder 212 can control the switch 248 to couple an output of the intra prediction mode block 246 to the residual calculation block 204 through the switch 248. In some such examples, the intra prediction block 260 can implement the prediction block 222.

In some examples, in response to configuring the decoder 212 to use CIIP mode, the decoder 212 can control the switch 248 to couple an output of the CIIP mode block 244 to the residual calculation block 204 through the switch 248. In some such examples, the output of the CIIP mode block 244 can implement the prediction block 222.

In some examples, the partitioning block 214, the first map block 202, the residual calculation block 204, the transform and quantization block 206, the entropy coding block 208, and/or the motion estimation block 210 can be implemented by hardware alone or by hardware in combination with software and/or firmware. Thus, for example, any of the partitioning block 214, the first map block 202, the residual calculation block 204, the transform and quantization block 206, the entropy coding block 208, and/or the motion estimation block 210 could be implemented by processor circuitry, analog circuit(s), digital circuit(s), logic circuit(s), programmable processor(s), programmable microcontroller(s), GPU(s), DSP(s), ASIC(s), PLD(s), and/or FPLD(s).

In some examples, the inverse transform and quantization block 226, the reconstruction block 230, the inverse map block 232, the deblocking filter 234, the SAO filter 236, the ALF filter 238, the buffer 240, the inter prediction mode block 242, the second map block 243, the CIIP mode block 244, the intra prediction mode block 246, and/or the switch 248 can be implemented by hardware alone or by hardware in combination with software and/or firmware. Thus, for example, any of the inverse transform and quantization block 226, the reconstruction block 230, the inverse map block 232, the deblocking filter 234, the SAO filter 236, the ALF filter 238, the buffer 240, the inter prediction mode block 242, the second map block 243, the CIIP mode block 244, the intra prediction mode block 246, and/or the switch 248 could be implemented by processor circuitry, analog circuit(s), digital circuit(s), logic circuit(s), programmable processor(s), programmable microcontroller(s), GPU(s), DSP(s), ASIC(s), PLD(s), and/or FPLD(s).

Figure 3:
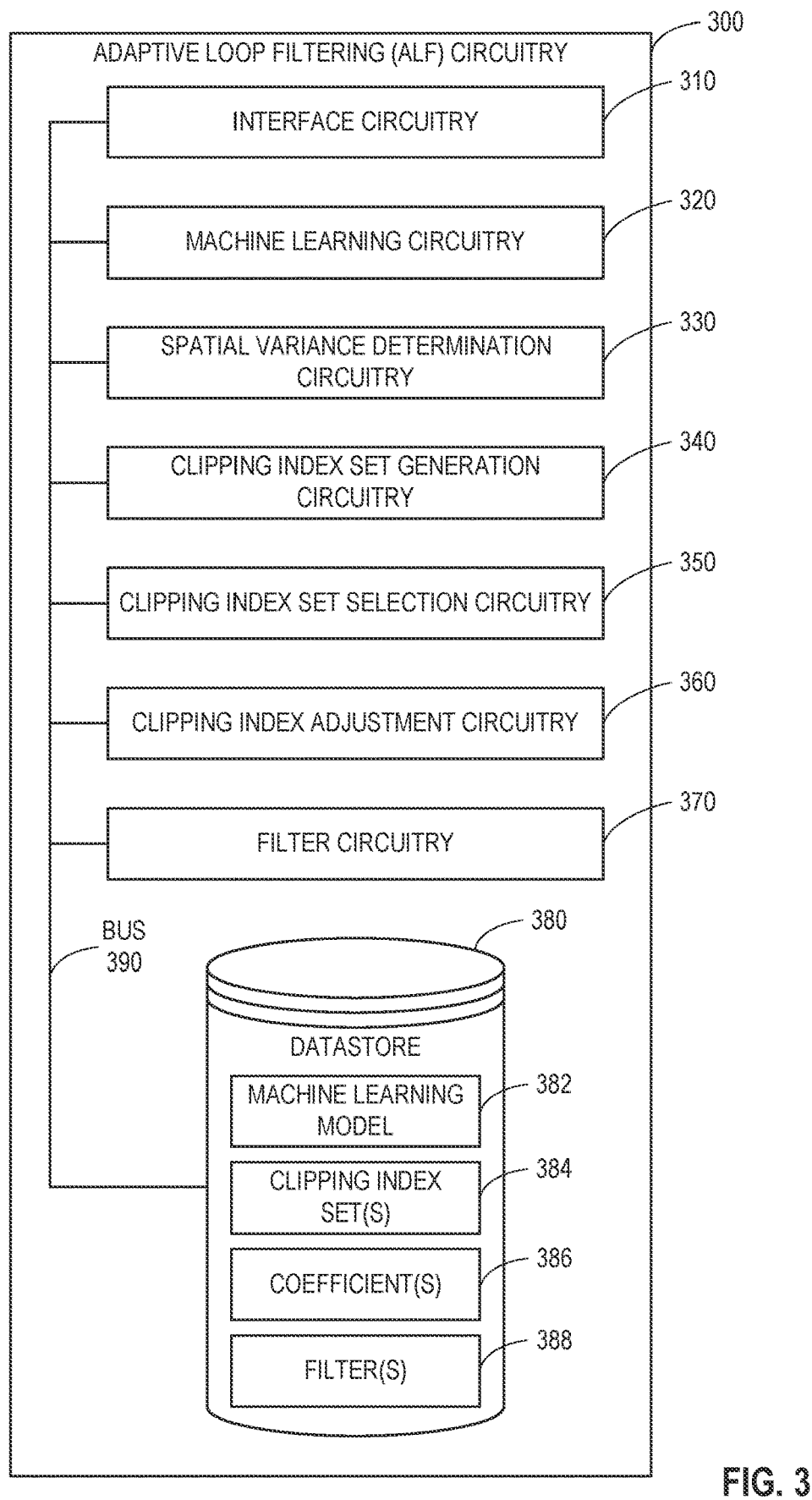
FIG. 3 is a block diagram of an example implementation of the adaptive loop filter of FIG. 2.

FIG. 3 is a block diagram of example adaptive loop filtering (ALF) circuitry 300 to filter a reconstructed block to smooth pixel transitions, or otherwise improve video quality. In some examples, the ALF circuitry 300 can implement the ALF filter 238 of FIG. 2. The ALF circuitry 300 of FIG. 3 may be instantiated (e.g., creating an instance of, bring into being for any length of time, materialize, implement, etc.) by processor circuitry such as a central processing unit executing instructions. Additionally or alternatively, the ALF circuitry 300 of FIG. 3 may be instantiated (e.g., creating an instance of, bring into being for any length of time, materialize, implement, etc.) by an ASIC or an FPGA structured to perform operations corresponding to the instructions. It should be understood that some or all of the ALF circuitry 300 of FIG. 3 may, thus, be instantiated at the same or different times. Some or all of the circuitry may be instantiated, for example, in one or more threads executing concurrently on hardware and/or in series on hardware. Moreover, in some examples, some or all of the ALF circuitry 300 of FIG. 3 may be implemented by one or more virtual machines and/or containers executing on the microprocessor.

The ALF circuitry 300 of the illustrated example includes example interface circuitry 310, example machine learning circuitry 320, example spatial variance determination circuitry 330, example clipping index set generation circuitry 340, example clipping index set selection circuitry 350, example clipping index adjustment circuitry 360, example filter circuitry 370, an example datastore 380, and an example bus 390. The datastore 380 of the illustrated example includes an example machine learning model 382, example clipping index set(s) 384, example coefficient(s) 386 (e.g., filter coefficients), and example filters 388.

In the illustrated example of FIG. 3, the interface circuitry 310, the machine learning circuitry 320, the spatial variance determination circuitry 330, the clipping index set generation circuitry 340, the clipping index set selection circuitry 350, the clipping index adjustment circuitry 360, the filter circuitry 370, and the datastore 380 are in communication with one(s) of each other via the bus 390. For example, the bus 390 can be implemented by at least one of an Inter-Integrated Circuit (I2C) bus, a Serial Peripheral Interface (SPI) bus, a Peripheral Component Interconnect (PCI) bus, or a Peripheral Component Interconnect Express (PCIe or PCIE) bus. Additionally or alternatively, the bus 390 can be implemented by any other type of computing or electrical bus.

The ALF circuitry 300 of the illustrated example includes the interface circuitry 310 to receive a video frame including pixel data. For example, the interface circuitry 310 can receive a portion (e.g., a slice) of a video frame from the SAO filter 236 of FIG. 2. In some examples, the portion of the video frame can include pixel data, which can include luma and/or chroma values of one or more pixels of the slice of the video frame. In some examples, the interface circuitry 310 can determine whether another video frame has been received to process. In some examples, the interface circuitry 310 receives other types of data, such as training data used to train a machine learning model as described in further detail below. For example, the training data can include a pool of test clips, videos, etc., that can vary in any way such as display frequency, duration, media type, etc.

The ALF circuitry 300 of the illustrated example includes the machine learning circuitry 320 to instantiate a machine learning model based on machine learning model parameters. Artificial intelligence (AI), including machine learning (ML), deep learning (DL), and/or other artificial machine-driven logic, enables machines (e.g., computers, logic circuits, etc.) to use a model to process input data to generate an output based on patterns and/or associations previously learned by the model via a training process. For instance, the machine learning model 382 may be trained with data (e.g., offline data, training data, live or online data, etc.) to recognize patterns and/or associations and follow such patterns and/or associations when processing input data such that other input(s) result in output(s) consistent with the recognized patterns and/or associations.

Many different types of machine-learning models and/or machine-learning architectures exist. In some examples, the machine learning circuitry 320 generates the machine learning model 382 as neural network model(s). Using a neural network model enables the machine learning circuitry 320, and/or, more generally, the ALF circuitry 300, to execute an AI/ML workload. In general, machine-learning models/architectures that are suitable to use in the example approaches disclosed herein include recurrent neural networks. However, other types of machine learning models could additionally or alternatively be used such as supervised learning ANN models, clustering models, classification models, etc., and/or a combination thereof. Example supervised learning ANN models may include two-layer (2-layer) radial basis neural networks (RBN), learning vector quantization (LVQ) classification neural networks, etc. Example clustering models may include k-means clustering, hierarchical clustering, mean shift clustering, density-based clustering, etc. Example classification models may include logistic regression, support-vector machine or network, Naive Bayes, etc. In some examples, the machine learning circuitry 320 may compile and/or otherwise generate the machine learning model 382 as a lightweight machine learning model.

In general, implementing an ML/AI system involves two phases, a learning/training phase and an inference phase. In the learning/training phase, a training algorithm is used to train the machine learning model 382 to operate in accordance with patterns and/or associations based on, for example, training data. In general, the machine learning model 382 includes internal parameters (e.g., configuration data) that guide how input data is transformed into output data, such as through a series of nodes and connections within the machine learning model 382 to transform input data into output data. Additionally, hyperparameters (e.g., configuration data) are used as part of the training process to control how the learning is performed (e.g., a learning rate, a number of layers to be used in the machine learning model, etc.). Hyperparameters are defined to be training parameters that are determined prior to initiating the training process.

Different types of training may be performed based on the type of ML/AI model and/or the expected output. For example, the machine learning circuitry 320 may invoke supervised training to use inputs and corresponding expected (e.g., labeled) outputs to select parameters (e.g., by iterating over combinations of select parameters) for the machine learning model 382 that reduce model error. As used herein, "labeling" refers to an expected output of the machine learning model (e.g., a classification, an expected output value, etc.). Alternatively, the machine learning circuitry 320 may invoke unsupervised training (e.g., used in deep learning, a subset of machine learning, etc.) that involves inferring patterns from inputs to select parameters for the machine learning model 382 (e.g., without the benefit of expected (e.g., labeled) outputs).

In some examples, the machine learning circuitry 320 trains the machine learning model 382 using unsupervised clustering of operating observables. For example, the operating observables may include a rate distortion cost, a Bjontegaard rate (BD-Rate), spatial variances, temporal variances, etc. However, the machine learning circuitry 320 may additionally or alternatively use any other training algorithm such as stochastic gradient descent, Simulated Annealing, Particle Swarm Optimization, Evolution Algorithms, Genetic Algorithms, Nonlinear Conjugate Gradient, etc.

In some examples, the machine learning circuitry 320 may train the machine learning model 382 until the level of error is no longer reducing. In some examples, the machine learning circuitry 320 may train the machine learning model 382 locally on the encoder system 102 and/or remotely at an external computing system communicatively coupled to the encoder system 102. In some examples, the machine learning circuitry 320 trains the machine learning model 382 using hyperparameters that control how the learning is performed (e.g., a learning rate, a number of layers to be used in the machine learning model, etc.). In some examples, the machine learning circuitry 320 may use hyperparameters that control model performance and training speed such as the learning rate and regularization parameter(s). The machine learning circuitry 320 may select such hyperparameters by, for example, trial and error to reach an optimal model performance. In some examples, the machine learning circuitry 320 utilizes Bayesian hyperparameter optimization to determine an optimal and/or otherwise improved or more efficient network architecture to avoid model overfitting and improve the overall applicability of the machine learning model 382. Alternatively, the machine learning circuitry 320 may use any other type of optimization. In some examples, the machine learning circuitry 320 may perform re-training. The machine learning circuitry 320 may execute such re-training in response to override(s) by a user of the encoder system 102, a receipt of new training data, etc.

In some examples, the machine learning circuitry 320 facilitates the training of the machine learning model 382 using training data. In some examples, the machine learning circuitry 320 utilizes training data that originates from locally generated data, such as one(s) of video frame(s), clipping index set(s) 384, the coefficient(s) 386, the filter(s) 388, etc. In some examples, the machine learning circuitry 320 utilizes training data that originates from externally generated data. In some examples where supervised training is used, the machine learning circuitry 320 may label the training data. Labeling is applied to the training data by a user manually or by an automated data pre-processing system. In some examples, the machine learning circuitry 320 may pre-process the training data using, for example, an interface (e.g., the interface circuitry 310). In some examples, the machine learning circuitry 320 sub-divides the training data into a first portion of data for training the machine learning model 382, and a second portion of data for validating the machine learning model 382.

Once training is complete, the machine learning circuitry 320 may deploy the machine learning model 382 for use as an executable construct that processes an input and provides an output based on the network of nodes and connections defined in the machine learning model 382. The v may store the machine learning model 382 in the datastore 380. In some examples, the machine learning circuitry 320 may invoke the interface circuitry 310 to transmit the machine learning model 382 to external computing system(s). In some such examples, in response to transmitting the machine learning model 382 to the external computing system(s), the external computing system(s) may execute the machine learning model 382 to execute AI/ML workloads with at least one of improved efficiency or performance.

Once trained, the deployed machine learning model 382 may be operated in an inference phase to process data. In the inference phase, data to be analyzed (e.g., live data) is input to the machine learning model 382, and the machine learning model 382 executes to create an output. This inference phase can be thought of as the AI "thinking" to generate the output based on what it learned from the training (e.g., by executing the machine learning model 382 to apply the learned patterns and/or associations to the live data). In some examples, input data undergoes pre-processing before being used as an input to the machine learning model 382. Moreover, in some examples, the output data may undergo post-processing after it is generated by the machine learning model 382 to transform the output into a useful result (e.g., a generation of a pool of clipping index set candidates, priorities to be assigned to the one(s) of the pool of the clipping index set candidates, an instruction to be executed by a machine, etc.).

In some examples, output of the deployed machine learning model 382 may be captured and provided as feedback. By analyzing the feedback, an accuracy of the deployed the machine learning model 382 can be determined. If the feedback indicates that the accuracy of the deployed model is less than a threshold or other criterion, training of an updated model can be triggered using the feedback and an updated training data set, hyperparameters, etc., to generate an updated, deployed model.

As used herein, "data" is information in any form that may be ingested, processed, interpreted and/or otherwise manipulated by processor circuitry to produce a result. The produced result may itself be data. As used herein, a "threshold" is expressed as data such as a numerical value represented in any form, that may be used by processor circuitry as a reference for a comparison operation. As used herein, a "model" is a set of instructions and/or data that may be ingested, processed, interpreted and/or otherwise manipulated by processor circuitry to produce a result. Often, a model is operated using input data to produce output data in accordance with one or more relationships reflected in the model. The model may be based on training data.

In some examples, the machine learning circuitry 320 executes the machine learning model 382 to output machine learning outputs. In some examples, the machine learning outputs can include priorities of respective clipping index set candidates in a pool or collection of clipping index set candidates. For example, the priorities can include a first priority assigned to a first clipping index set candidate, a second priority assigned to a second clipping index set candidate, etc. In some such examples, the first priority is higher or greater than the second priority.

In some examples, the machine learning outputs can include a Bjontegaard rate difference, also known as BD-rate. The BD-rate is a measurement of the bitrate reduction offered by a codec or codec feature, while maintaining the same quality as measured by objective metrics. In some examples, the machine learning circuitry 320 can calculate the BD-rate as the average percent difference in rate over a range of qualities. By way of example, given a reference codec and a test codec, the machine learning circuitry 320 can determine the BD-rate as follows: (i) determine rate/distortion points for the reference and test codec; (ii) convert the rates into log-rates; (iii) fit a piecewise cubic hermite interpolating polynomial to the points for each codec to produce functions of log-rate in terms of distortion; (iv) determine metric score ranges (e.g., calculate either from a range of bitrates of the reference codec, or from quantizers of a third, anchor codec); (v) numerically integrate the log-rate over the metric range for each curve, using at least a threshold number of samples (e.g., 500 samples, 1000 samples, 2000 samples, etc.) and trapezoidal integration; (vi) convert the resulting integrated log-rates back into linear rate; and/or (vii) calculate the percent difference from the reference to the test codec to output the BD-rate. For example, the reference codec and a test codec, such as VVC codec including example ALF filters as described herein, can be provided to the machine learning model 382 as inputs to generate outputs such as the BD-rate.

In some examples, the machine learning circuitry 320 determines whether one(s) of the machine learning outputs satisfy a threshold. For example, the machine learning circuitry 320 can determine whether an accuracy of the machine learning model 382 is greater than a threshold (e.g., an accuracy threshold) and thereby the accuracy satisfies the threshold. In some examples, the machine learning circuitry 320 can determine whether an error of the machine learning model 382 is less than a threshold (e.g., an error threshold) and thereby the error satisfies the threshold.

In some examples, in response to a determination by the machine learning circuitry 320 that the one(s) of the machine learning outputs do not satisfy threshold(s) (e.g., respective threshold(s)), then the machine learning circuitry 320 can execute (e.g., iteratively execute) the machine learning model 382 to output machine learning outputs until the one(s) of the machine learning outputs satisfy the threshold(s). In some examples, in response to a determination by the machine learning circuitry 320 that the one(s) of the machine learning outputs satisfy threshold(s) (e.g., respective threshold(s)), then the machine learning circuitry 320 can invoke and/or otherwise cause the clipping index set generation circuitry 340 to generate a pool of clipping index set candidates using the machine learning model 382. In some examples, the machine learning circuitry 320 can determine whether to select and/or instantiate another machine learning model to train. For example, the machine learning model 382 can be a neural network and the machine learning circuitry 320 can determine to instantiate a reinforcement learning model (or any other type of AI/ML model) to train to generate clipping index set candidates for use in ALF filtering.

The ALF circuitry 300 of the illustrated example includes the spatial variance determination circuitry 330 to determine a variance (e.g., a spatial variance, a local image variance, a square of a standard deviation, etc.) of a video frame (e.g., a video frame to be encoded in the bitstream 228 of FIG. 2). In some examples, the spatial variance determination circuitry 330 can calculate, compute, and/or otherwise determine a local image variance in an image, or portion(s) thereof, and classify areas for which the variance is below a threshold as smooth. For example, the spatial variance determination circuitry 330 can determine a mean or average (e.g., a local mean or average) of the video frame and thereby determine a variance with respect to the mean. In some examples, the spatial variance determination circuitry 330 can determine (e.g., by estimation) the variance of the video frame using a weighted neighborhood (such as a Gaussian function centered about a pixel (e.g., a center pixel) of the video frame). In some examples, the spatial variance determination circuitry 330 can determine a spatial variance within a video frame by replacing each pixel in a CTB, a CU, etc., with the variance of the pixels of a surrounding window (e.g., a square window). For example, the spatial variance determination circuitry 330 can determine the spatial variance for a video frame based on a difference between a center pixel and its neighboring pixels.

In some examples, the spatial variance determination circuitry 330 can determine whether a video frame is a smooth video frame based on the spatial variance. For example, the spatial variance determination circuitry 330 can determine a spatial variance associated with a video frame to be encoded. In some such examples, the spatial variance determination circuitry 330 can determine whether the spatial variance satisfies a threshold (e.g., a variance threshold, a spatial variance threshold, etc.). For example, the spatial variance determination circuitry 330 can identify the video frame as a smooth video frame in response to determining that the spatial variance is less than a threshold and thereby the spatial variance does not satisfy the threshold. In some such examples, the spatial variance determination circuitry 330 can determine that the video frame is a smooth video frame because pixel(s) of the video frame do not vary substantially from their neighboring pixels, the video frame contains sharp textures, etc.

In some examples, the spatial variance determination circuitry 330 can identify the video frame as a non-smooth video frame in response to determining that the spatial variance is greater than a threshold and thereby the spatial variance satisfies the threshold. In some such examples, the spatial variance determination circuitry 330 can determine that the video frame is not a smooth video frame because the video frame is substantially different from the reference video frame, the previously encoded video frame, etc.

The ALF circuitry 300 of the illustrated example includes the clipping index set generation circuitry 340 to generate one or more clipping index set candidates from a pool of clipping index set candidates by executing a machine learning model. For example, the clipping index set generation circuitry 340 can invoke, instruct, and/or otherwise cause the machine learning circuitry 320 to execute the machine learning model 382 with a video frame to be encoded as a model input to generate model output(s), which can include the pool of the clipping index set candidates. In some examples, the clipping index set generation circuitry 340 can generate the pool of the clipping index set candidates. In some examples, the clipping index set generation circuitry 340 can receive the pool of the clipping index set candidates from the machine learning model 382, and/or, more generally, from the machine learning circuitry 320.

In some examples, the clipping index set generation circuitry 340 can assign a priority to respective ones of the pool of the clipping index set candidates. For example, the clipping index set generation circuitry 340 can assign a first priority to a first clipping index set candidate, a second priority less than the first priority to a second clipping index set candidate, etc., that may be included in the pool of the clipping index set candidates. In some such examples, the priority can be representative of an order in which the clipping index set candidates are to be analyzed, evaluated, and/or otherwise processed. For example, the first clipping index set candidate may be evaluated prior to the second clipping index set candidate because the first clipping index set candidate has a higher priority than the priority of the second clipping index set candidate. In some examples, the clipping index set generation circuitry 340 can assign the priority based on a likelihood that a clipping index set is to be used and/or otherwise signaled in the bitstream 228 of FIG. 2. For example, the clipping index set generation circuitry 340 can determine the likelihood based on output(s) from the machine learning model 382.

In some examples, the clipping index set generation circuitry 340 can store a pool of clipping index set candidates in the datastore 380 as the clipping index set(s) 384. In some examples, the clipping index set generation circuitry 340 can store associations of priorities and respective ones of the pool of the clipping index set candidates in the datastore 380. For example, the clipping index set generation circuitry 340 can store the associations as part of, included in, and/or otherwise in connection with the clipping index set(s) 384.

In some examples, the clipping index set generation circuitry 340 can generate a luma clipping (LC) index set of {LC0, LC1, LC2, LC3, LC4, LC5, LC6, LC7, LC8, LC9, LC10, LC11}. In some such examples, the luma clipping index set can include 12 clipping index values (i.e., LC0-LC11) that correspond to a respective one of luma ALF coefficients (i.e., C0-C11) in the first ALF filter 602 of the illustrated example of FIG. 6. In some examples, each of the luma clipping index values can have a value of 0, 1, 2, or 3. For example, the values of 0, 1, 2, or 3 can correspond to a clipping value defined in the VVC/H.266 standard.

In some examples, the clipping index set generation circuitry 340 can generate a type of clipping index set, such as a luma ALF clipping index set, a chroma ALF clipping index set, etc. For example, the clipping index set generation circuitry 340 can generate a chroma clipping (CC) index set of {CC0, CC1, CC2, CC3, CC4, CC5}. In some such examples, the chroma clipping index set can include 7 chroma clipping index values (i.e., CC0-CC6) that correspond to a respective one of chroma ALF coefficients (i.e., C0-05) in the second ALF filter 604 of the illustrated example of FIG. 6. In some examples, each of the chroma clipping index values can have a value of 0, 1, 2, or 3. For example, the values of 0, 1, 2, or 3 can correspond to a clipping value defined in the VVC/H.266 standard.

The ALF circuitry 300 of the illustrated example includes the clipping index set selection circuitry 350 to select a clipping index set from the clipping index set candidates. In some examples, the clipping index set can include clipping indices or index values that point to and/or otherwise correspond to clipping coefficients. In some examples, the clipping indices are signaled in the bitstream 228. In some examples, the clipping coefficients are signaled in the bitstream 228. For example, in VVC, an encoder, such as the encoder 108 of FIGS. 1 and/or 2, can use an adaptation parameter set (APS) data structure that signals various parameters, such as ALF coefficients and SAO parameters, for one or more slices of video data. For example, an APS data structure may apply to a single slice or a plurality of slices. A slice may use multiple APSs, and an APS may apply to more than one slice. In some examples, an APS can include an identifier value, and a slice may indicate that an APS applies to the slice by signaling the identifier for the APS. In some examples, the identifier value for an APS may uniquely identify the APS for the corresponding bitstream. In some such examples, the clipping index set selection circuitry 350 can signal a clipping index, a clipping coefficient, etc., by including the clipping index, the clipping coefficient, etc., in an APS data structure.

In some examples, in response to a determination that a video frame is identified as a smooth video frame, the clipping index set selection circuitry 350 can disable clipping for the video frame. For example, the clipping index set selection circuitry 350 may not signal clipping indices, clipping coefficients, etc., in the bitstream 228 because the video frame has no sharp textures (or relatively few sharp textures) or very blurred textures. Advantageously, in some such examples, the clipping index set selection circuitry 350 can disable clipping to improve an efficiency of determining which clipping indice(s) to signal because the determining can be disabled.

In some examples, the clipping index set selection circuitry 350 determines whether an encoder, such as the encoder 108 of FIGS. 1 and/or 2, is to implement a low-complexity non-linear clipping index determination technique or a high-quality non-linear clipping index determination technique. For example, the clipping index set selection circuitry 350 can determine that the encoder is configured and/or otherwise adapted to process a relatively few number of clipping index sets (e.g., 1 clipping index set, 2 clipping index sets, etc.), which may implement a low-complexity non-linear clipping index determination technique. In some such examples, the clipping index set selection circuitry 350 can implement such a technique by selecting a clipping index set candidate that has the highest priority of one(s) of the pool of the clipping index set candidates.

In some examples, the clipping index set selection circuitry 350 can determine that the encoder is configured and/or otherwise adapted to process numerous clipping index sets, which may implement a high-quality non-linear clipping index determination technique. In some such examples, the clipping index set selection circuitry 350 can evaluate a plurality of clipping index set candidates from a pool of clipping index set candidates to determine an optimal clipping index set candidate, which may be associated with a reduced and/or otherwise minimal rate distortion cost, an increased and/or otherwise optimal BD-rate, etc., and/or any combination(s) thereof. In some examples, the clipping index set selection circuitry 350 can select a first clipping index set candidate from a pool of clipping index set candidates to process. The clipping index adjustment circuitry 360 as described below can adjust and/or otherwise modify the selected clipping index set candidate. In some examples, the clipping index set selection circuitry 350 can select a second clipping index set candidate from the pool of the clipping index set candidates to process. In some such examples, the clipping index set selection circuitry 350 can select a clipping index set candidate with the lowest rate distortion cost as modified by the clipping index adjustment circuitry 360. In some examples, the first clipping index set candidate and/or the second clipping index set candidate is selected in response to determining that the encoder is configured to process numerous clipping index sets.

The ALF circuitry 300 of the illustrated example includes the clipping index adjustment circuitry 360 to adjust one(s) of clipping coefficients included in a clipping index set candidate. For example, the clipping index adjustment circuitry 360 can receive a luma clipping index set (e.g., a luma ALF clipping index set) of {3, 2, 2, 2, 3, 2, 0, 2, 2, 3, 2, 0, 2}. In some such examples, the clipping index adjustment circuitry 360 can determine a first rate distortion cost associated with the luma clipping index set. In some examples, the clipping index adjustment circuitry 360 can adjust the first clipping index (i.e., LC0) from a value of 3 to a value of 2. The clipping index adjustment circuitry 360 can determine a second rate distortion cost associated with the luma clipping index set with the adjusted value of the first clipping index. The clipping index adjustment circuitry 360 can determine whether the second rate distortion cost is less than the first rate distortion cost. clipping index adjustment circuitry 360 can adjust (e.g., iteratively adjust) one(s) of the clipping indices to reduce and/or otherwise minimize the rate distortion cost. In response to a determination that the clipping index adjustment circuitry 360 has identified values of the clipping indices of the clipping index set that reduce and/or otherwise minimize the rate distortion cost associated with an ALF filter (e.g., a luma ALF filter), the clipping index set selection circuitry 350 can select the clipping index set candidate with the lowest rate distortion cost as modified by the adjustment(s).

In some examples, the clipping index adjustment circuitry 360 adjusts a priority of one(s) of the pool of the clipping index set candidates based on a selection of a clipping index set candidate. For example, the clipping index set generation circuitry 340 can generate a pool of clipping index set candidates that include first, second, and third clipping index set candidates. In response to the clipping index set selection circuitry 350 selecting the first clipping index set candidate, the clipping index adjustment circuitry 360 can increase a priority of the first clipping index set candidate because the first clipping index set candidate is selected and may have a higher likelihood of being selected again. In some examples, the clipping index adjustment circuitry 360 can reduce a priority of the second and/or third clipping index set candidates because they are not selected and may have a lower likelihood of being selected.

The ALF circuitry 300 of the illustrated example includes the filter circuitry 370 to filter a video frame based on clipping coefficients. For example, the filter circuitry 370 can execute an ALF filter (e.g., a luma ALF filter, a chroma ALF filter, etc.) based on clipping coefficients associated with a clipping index set candidate selected by the clipping index set selection circuitry 350. For example, the filter circuitry 370 can carry out, perform, effectuate, and/or otherwise execute adaptive loop filtering based on the clipping coefficients (e.g., the luma ALF clipping coefficients, the chroma ALF clipping coefficients, etc.).

In some examples, the filter circuitry 370 generates a number of filters (e.g., ALF filters) to filter a video frame based on a clipping index set candidate. For example, the filter circuitry 370 can receive a clipping index set candidate that is selected from a pool of clipping index set candidates. In some such examples, the filter circuitry 370 can determine one or more of the filters 388, one(s) of the coefficient(s) 386 thereof, etc., based on the clipping index set candidate (e.g., clipping coefficients indicated by clipping indices in the clipping index set candidate). In some examples, the filter circuitry 370 can determine and/or otherwise derive 25 filters of the luma filter set 510 of FIG. 5 based on the clipping coefficients of the clipping index set candidate. In some examples, the clipping index adjustment circuitry 360 can determine a rate distortion cost associated with the one or more filters in an effort to identify a clipping index set candidate and value(s) thereof for use in filtering a video frame to be encoded in the bitstream 228 of FIG. 2. In some examples, the filter circuitry 370 causes a video frame to be encoded. For example, the filter circuitry 370 can output a filtered video frame, in-loop parameters (e.g., filter coefficients, clipping indices, clipping coefficients, etc.), etc., and/or any combination(s) thereof to the entropy coding block 208 of FIG. 2 for inclusion in the bitstream 228.

In example operation, during the video encoding process, the spatial variance determination circuitry 330 can perform video spatial analysis to check if a current video frame to be encoded is a smooth video frame. If the spatial variance determination circuitry 330 detects the current video frame as a smooth picture, the clipping index set selection circuitry 350 can determine that no clipping is needed for ALF filtering and the clipping index set selection circuitry 350 can disable non-linear clipping for the current video frame. Otherwise, the clipping index set generation circuitry 340 can apply adaptive candidate (e.g., clipping index set candidate) selection to select candidates from a generated clipping set candidate pool (e.g., an offline or online generated clipping set candidate pool). In some examples, the clipping index set generation circuitry 340 can invoke the machine learning model 382 to generate all of the candidates in the pool based on offline training and/or analysis. In some examples, the clipping index set generation circuitry 340 can assign each candidate in the pool with a priority order number based on the probability that the respective candidate is to be used and/or the quality gain the respective candidate can bring as a result of the ALF filtering. In some examples, the clipping index set selection circuitry 350 can select a set of candidates in the pool with highest priority.

In some examples, based on the complexity requirement, specification, etc., of the encoder (e.g., the encoder 108 of FIGS. 1 and/or 2), different implementations to determine the clipping indices for each video frame may be pursued. For example, the clipping index set selection circuitry 350 can determine how the encoder is to operate according to the complexity and performance requirements. In some such examples, the clipping index set selection circuitry 350 can determine that the complexity requirements indicate that the encoder is to operate with low or reduced complexity, and as such, the clipping index set selection circuitry 350 can select one to two top candidates from the pool to evaluate. Advantageously, the clipping index set selection circuitry 350, and/or, more generally, the encoder, may only need to search selected candidates, which may include a clipping off or clipping disabled option, to decide the clipping set with the smallest and/or otherwise minimized rate distortion cost. In some examples, the clipping index set selection circuitry 350 can determine that the performance requirements indicate that the encoder is operate with high or improved quality, and as such, the clipping index set selection circuitry 350 can select a candidate (e.g., the same or different candidate from the low complexity operation) to decide a number of filters (e.g., ALF filters). In some examples, after the number of filters are decided, the clipping index adjustment circuitry 360 can carry out clipping index refinement by incrementing or decrementing clipping index values (e.g., incrementing a clipping index value by 1 (or other value), decrementing a clipping index value by 1 (or other value), etc.). For example, the clipping index adjustment circuitry 360 can carry out clipping index refinement to a subset of coefficients that are closer to the center location of a filter (e.g., $c_{12}$ of the first ALF filter 602, $c_6$ of the second ALF filter 604, etc.). In some examples, the clipping index set selection circuitry 350 can select the clipping indices, and/or, more generally, the clipping index set candidate, with the smallest rate distortion cost. In some examples, during the encoding process, the clipping index adjustment circuitry 360 can effectuate a candidate priority adjustment to adjust the priority order of the candidates in the pool based on the feedback from the already encoded frames. In some examples, the clipping index adjustment circuitry 360 can assign the highest priority to the candidate that has been used most frequently. In some examples, the clipping index adjustment circuitry 360 can reduce the number of selected candidates by removing the least utilized candidates from the initial selections. For example, the clipping index adjustment circuitry 360 can remove the least utilized clipping index set candidates from the clipping index set(s) 384.

The ALF circuitry 300 of the illustrated example includes the datastore 380 to record data, such as the machine learning model 382, the clipping index set(s) 384, the coefficient(s) 386, and the filter(s) 388. For example, the machine learning model 382 can be implemented with any type of AI/ML model such as a neural network. In some examples, the clipping index set(s) 384 can be implemented with one or more clipping index sets, such as one or more luma ALF clipping index sets, one or more chroma ALF clipping index sets, etc. in some examples, the coefficient(s) 386 can be implemented by ALF filter coefficients, such as luma ALF filter coefficients, chroma ALF filter coefficients, etc. In some examples, the filter(s) 388 can be implemented with one or more filters, such as one or more luma ALF filters, one or more chroma ALF filters, one or more CC-ALF filters, etc.

In some examples, the datastore 380 can be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The datastore 380 may additionally or alternatively be implemented by one or more double data rate (DDR) memories, such as DDR, DDR2, DDR3, DDR4, DDR5, mobile DDR (mDDR), DDR SDRAM, etc. The datastore 380 may additionally or alternatively be implemented by one or more mass storage devices such as hard disk drive(s) (HDD(s)), compact disk (CD) drive(s), digital versatile disk (DVD) drive(s), solid-state disk (SSD) drive(s), Secure Digital (SD) card(s), CompactFlash (CF) card(s), etc. While in the illustrated example the datastore 380 is illustrated as a single database, the datastore 380 may be implemented by any number and/or type(s) of databases. Furthermore, the data stored in the datastore 380 may be in any data format such as, for example, binary data, comma delimited data, tab delimited data, structured query language (SQL) structures, etc. The term "database" as used herein means an organized body of related data, regardless of the manner in which the data or the organized body thereof is represented. For example, the organized body of related data may be in the form of one or more of a table, a map, a grid, a packet, a datagram, a frame, a file, an e-mail, a message, a document, a report, a list or in any other form.

In some examples, the ALF circuitry 300 includes means for receiving a video frame to be encoded. For example, the means for receiving may be implemented by the interface circuitry 310. In some examples, the interface circuitry 310 may be instantiated by processor circuitry such as the example processor circuitry 1212 of FIG. 12. For instance, the interface circuitry 310 may be instantiated by the example general purpose processor circuitry 1300 of FIG. 13 executing machine executable instructions such as that implemented by at least blocks 902, 918 of FIG. 9 and block 1104 of FIG. 11. In some examples, the interface circuitry 310 may be instantiated by hardware logic circuitry, which may be implemented by an ASIC or the FPGA circuitry 1400 of FIG. 14 structured to perform operations corresponding to the machine readable instructions. Additionally or alternatively, the interface circuitry 310 may be instantiated by any other combination of hardware, software, and/or firmware. For example, the interface circuitry 310 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.), a transmitter, a receiver, a transceiver, a modem, a residential gateway, a wireless access point, and/or a network interface structured to execute some or all of the machine readable instructions and/or to perform some or all of the operations corresponding to the machine readable instructions without executing software or firmware, but other structures are likewise appropriate.

In some examples, the ALF circuitry 300 includes means for executing a machine learning model. For example, the means for executing may be implemented by the machine learning circuitry 320. In some examples, the machine learning circuitry 320 may be instantiated by processor circuitry such as the example processor circuitry 1212 of FIG. 12. For instance, the machine learning circuitry 320 may be instantiated by the example general purpose processor circuitry 1300 of FIG. 13 executing machine executable instructions such as that implemented by at least blocks 1102, 1106, 1108, 1116 of FIG. 11. In some examples, the machine learning circuitry 320 may be instantiated by hardware logic circuitry, which may be implemented by an ASIC or the FPGA circuitry 1400 of FIG. 14 structured to perform operations corresponding to the machine readable instructions. Additionally or alternatively, the machine learning circuitry 320 may be instantiated by any other combination of hardware, software, and/or firmware. For example, the machine learning circuitry 320 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the means for executing is to instantiate a machine learning model based on machine learning model parameters. In some examples, the means for executing is to execute the machine learning model to output a machine learning output. In some examples, the means for executing is to, in response to the machine learning output satisfying a threshold, deploy the machine learning model to generate the pool of the clipping index set candidates, assign a priority to respective ones of the pool of the clipping index set candidates, and store associations of the priorities and respective ones of the pool of the clipping index set candidates.

In some examples, the ALF circuitry 300 includes means for determining a variance (e.g., a spatial variance) of a video frame. For example, the means for determining may be implemented by the spatial variance determination circuitry 330. In some examples, the spatial variance determination circuitry 330 may be instantiated by processor circuitry such as the example processor circuitry 1212 of FIG. 12. For instance, the spatial variance determination circuitry 330 may be instantiated by the example general purpose processor circuitry 1300 of FIG. 13 executing machine executable instructions such as that implemented by at least blocks 904, 906 of FIG. 9. In some examples, the spatial variance determination circuitry 330 may be instantiated by hardware logic circuitry, which may be implemented by an ASIC or the FPGA circuitry 1400 of FIG. 14 structured to perform operations corresponding to the machine readable instructions. Additionally or alternatively, the spatial variance determination circuitry 330 may be instantiated by any other combination of hardware, software, and/or firmware.

For example, the spatial variance determination circuitry 330 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the means for determining is to determine whether the spatial variance satisfies a threshold. In some examples, the means for determining is to identify the video frame as a smooth video frame based on the spatial variance not satisfying the threshold. In some examples, the means for determining is to determine that the video frame is not a smooth video frame based on the spatial variance satisfying the threshold.

In some examples, the ALF circuitry 300 includes means for generating a pool of clipping index set candidates. In some examples, the means for generating can generate the pool of the clipping index set candidates by executing a machine learning model. For example, the means for generating may be implemented by the clipping index set generation circuitry 340. In some examples, the clipping index set generation circuitry 340 may be instantiated by processor circuitry such as the example processor circuitry 1212 of FIG. 12. For instance, the clipping index set generation circuitry 340 may be instantiated by the example general purpose processor circuitry 1300 of FIG. 13 executing machine executable instructions such as that implemented by at least block 802 of FIG. 8, block 910 of FIG. 9, and blocks 1110, 1112, 1114 of FIG. 11. In some examples, the clipping index set generation circuitry 340 may be instantiated by hardware logic circuitry, which may be implemented by an ASIC or the FPGA circuitry 1400 of FIG. 14 structured to perform operations corresponding to the machine readable instructions. Additionally or alternatively, the clipping index set generation circuitry 340 may be instantiated by any other combination of hardware, software, and/or firmware. For example, the clipping index set generation circuitry 340 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the ALF circuitry 300 includes means for selecting a clipping index set from a pool of clipping index set candidates based on a rate distortion cost associated with the clipping index set. In some such examples, the clipping index set includes clipping coefficients. For example, the means for selecting may be implemented by the clipping index set selection circuitry 350. In some examples, the clipping index set selection circuitry 350 may be instantiated by processor circuitry such as the example processor circuitry 1212 of FIG. 12. For instance, the clipping index set selection circuitry 350 may be instantiated by the example general purpose processor circuitry 1300 of FIG. 13 executing machine executable instructions such as that implemented by at least block 804 of FIG. 8, blocks 908, 912 of FIG. 9, and blocks 1002, 1004, 1006, 1016, 1018 of FIG. 10. In some examples, the clipping index set selection circuitry 350 may be instantiated by hardware logic circuitry, which may be implemented by an ASIC or the FPGA circuitry 1400 of FIG. 14 structured to perform operations corresponding to the machine readable instructions. Additionally or alternatively, the clipping index set selection circuitry 350 may be instantiated by any other combination of hardware, software, and/or firmware. For example, the clipping index set selection circuitry 350 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the means for selecting is to, in response to determining (e.g., a determination) that the video frame is a smooth video frame based on a spatial variance, disable clipping for the video frame. In some examples, the means for selecting is to select a clipping index set in response to determining (e.g., a determination) that an encoder is configured to process numerous clipping index sets.

In some examples in which a clipping index set is a first clipping index set, clipping index set candidates include the first clipping index set and a second clipping index set, the means for selecting is to, in response to determining (e.g., a determination) that a first rate distortion cost associated with the first clipping index set is less than a second rate distortion cost associated with the second clipping index set, select the first clipping index set with one or more second values (e.g., adjusted values of clipping coefficients).

In some examples, the ALF circuitry 300 includes means for adjusting a priority of a clipping index set based on a selection of the clipping index set for encoding a video frame. For example, the means for adjusting may be implemented by the clipping index adjustment circuitry 360. In some examples, the clipping index adjustment circuitry 360 may be instantiated by processor circuitry such as the example processor circuitry 1212 of FIG. 12. For instance, the clipping index adjustment circuitry 360 may be instantiated by the example general purpose processor circuitry 1300 of FIG. 13 executing machine executable instructions such as that implemented by at least block 914 of FIG. 9 and blocks 1010, 1012, 1014 of FIG. 10. In some examples, the clipping index adjustment circuitry 360 may be instantiated by hardware logic circuitry, which may be implemented by an ASIC or the FPGA circuitry 1400 of FIG. 14 structured to perform operations corresponding to the machine readable instructions. Additionally or alternatively, the clipping index adjustment circuitry 360 may be instantiated by any other combination of hardware, software, and/or firmware. For example, the clipping index set generation circuitry 340 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the means for adjusting is to adjust the priority of the clipping index set by at least one of increasing the priority of the clipping index set or decreasing a respective priority of one or more of a pool of clipping index set candidates not selected. In some examples in which the clipping index set is a first clipping index set, the clipping index set candidates include the first clipping index set and a second clipping index set, the means for adjusting is to adjust one or more first values of the clipping coefficients of the first clipping index set to one or more second values. In some such examples, the means for adjusting is to determine a first rate distortion cost associated with the filters based on the one or more second values.

In some examples, the ALF circuitry 300 includes means for filtering a video frame based on clipping coefficients. For example, the means for filtering may be implemented by the filter circuitry 370. In some examples, the filter circuitry 370 may be instantiated by processor circuitry such as the example processor circuitry 1212 of FIG. 12. For instance, the filter circuitry 370 may be instantiated by the example general purpose processor circuitry 1300 of FIG. 13 executing machine executable instructions such as that implemented by at least block 806 of FIG. 8, block 916 of FIG. 9, and block 1008 of FIG. 10. In some examples, the filter circuitry 370 may be instantiated by hardware logic circuitry, which may be implemented by an ASIC or the FPGA circuitry 1400 of FIG. 14 structured to perform operations corresponding to the machine readable instructions. Additionally or alternatively, the filter circuitry 370 may be instantiated by any other combination of hardware, software, and/or firmware. For example, the filter circuitry 370 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples in which a clipping index set is a first clipping index set, clipping index set candidates include the first clipping index set and a second clipping index set, the means for filtering is to generate a number of filters to filter the video frame based on the first clipping index set.

While an example manner of implementing the ALF filter 238 of FIG. 2 is illustrated in FIG. 3, one or more of the elements, processes, and/or devices illustrated in FIG. 2 may be combined, divided, re-arranged, omitted, eliminated, and/or implemented in any other way. Further, the interface circuitry 310, the machine learning circuitry 320, the spatial variance determination circuitry 330, the clipping index set generation circuitry 340, the clipping index set selection circuitry 350, the clipping index adjustment circuitry 360, the filter circuitry 370, and the datastore 380, the machine learning model 382, the clipping index set(s) 384, the coefficient(s) 386, the filter(s) 388, the bus 390, and/or, more generally, the example ALF filter 238 of FIG. 2, may be implemented by hardware alone or by hardware in combination with software and/or firmware. Thus, for example, any of the interface circuitry 310, the machine learning circuitry 320, the spatial variance determination circuitry 330, the clipping index set generation circuitry 340, the clipping index set selection circuitry 350, the clipping index adjustment circuitry 360, the filter circuitry 370, and the datastore 380, the machine learning model 382, the clipping index set(s) 384, the coefficient(s) 386, the filter(s) 388, the bus 390, and/or, more generally, the example ALF filter 238, could be implemented by processor circuitry, analog circuit(s), digital circuit(s), logic circuit(s), programmable processor(s), programmable microcontroller(s), GPU(s), DSP(s), ASIC(s), PLD(s), and/or FPLD(s). Further still, the example ALF filter 238 of FIG. 2 may include one or more elements, processes, and/or devices in addition to, or instead of, those illustrated in FIG. 3, and/or may include more than one of any or all of the illustrated elements, processes and devices.

Figure 4:
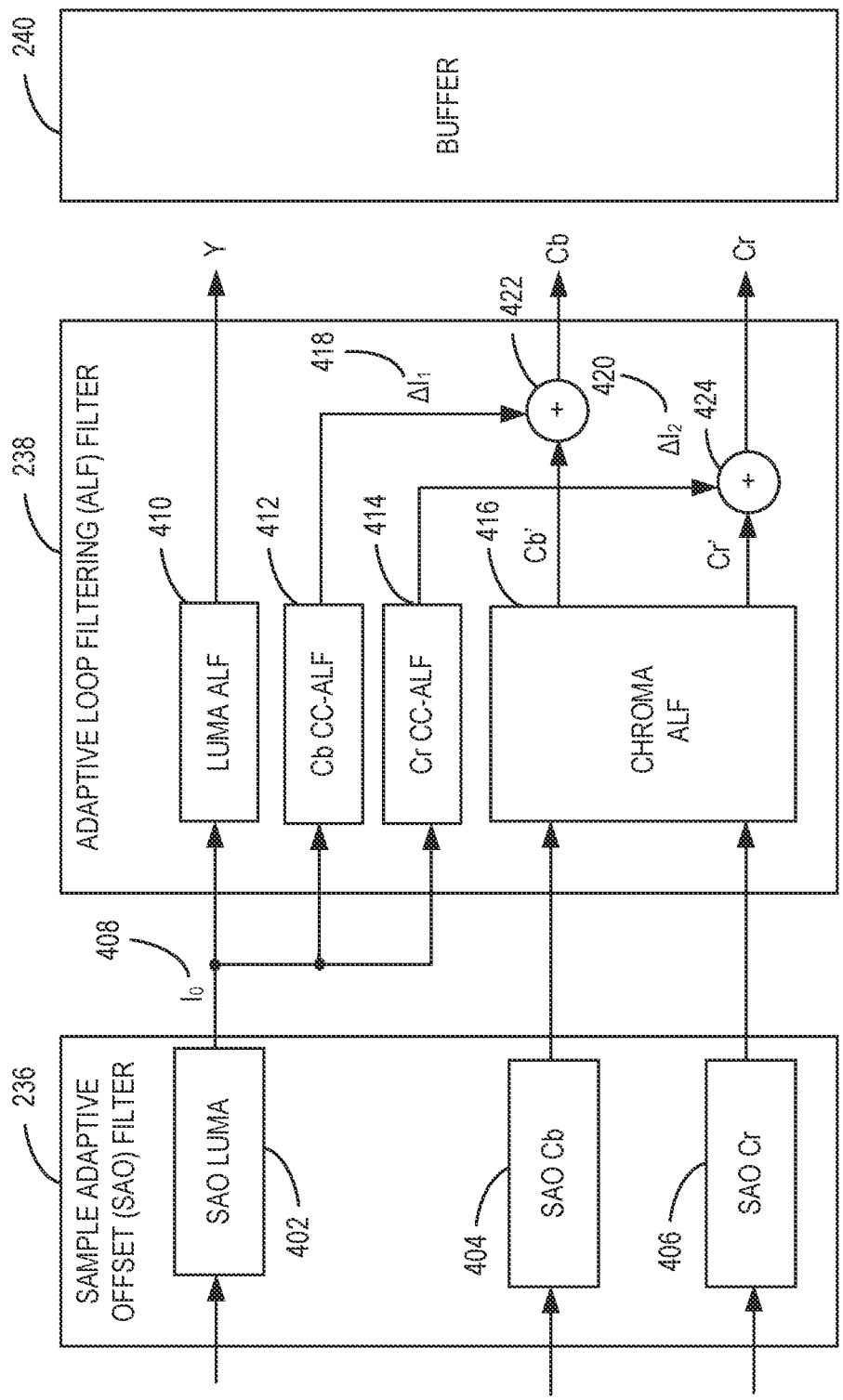
FIG. 4 is a block diagram of another example implementation of the adaptive loop filter of FIGS. 2 and/or 3, which includes an example chrominance adaptive loop filter and an example luminance adaptive loop filter.

FIG. 4 is a block diagram of an example implementation of the SAO filter 236, the ALF filter 238, and the buffer 240 of FIG. 2. The SAO filter 236 of the illustrated example includes an example SAO luma filter 402, an example SAO Cb filter 404, and an example SAO Cr filter 406. In this example, the SAO filter 236 can reduce sample distortion by first classifying reconstructed samples into different categories, obtaining an offset for each category, and then adding the offset to each sample of the category. For example, the offset can be included in a look-up table generated and/or maintained by the encoder 108 of FIGS. 1 and/or 2. In some examples, the SAO filter 236 can apply edge offsets and/or border offsets. For edge offsets, the SAO filter 236 can determine the classification of the reconstructed samples based on comparisons between current samples and neighboring samples. For border offsets, the SAO filter 236 can determine the classification of the reconstructed samples based on sample values.

In the illustrated example, the SAO luma filter 402 can process reconstructed luma samples to output example processed luma samples 408 (identified by $I_0$). In the illustrated example, the SAO Cb filter 404 can process reconstructed Cb samples (e.g., a blue minus luma (B-Y) sample in a YCbCr color space or format). In the illustrated example, the SAO Cr filter 406 can process reconstructed Cr samples (e.g., a red minus luma (R-Y) sample in a YCbCr color space or format).

In the illustrated example, the ALF filter 238 operates to reduce and/or otherwise minimize a difference between an original input (e.g., the coding block 218 or portion(s) of the input image 216) and the outputs from the SAO filter 236 through Wiener filtering.

The ALF filter 238 of the illustrated example includes a first example ALF filter 410 (identified by LUMA ALF), a first example CC-ALF filter 412 (identified by Cb CC-ALF), a second example CC-ALF filter 414 (identified by Cr CC-ALF), and a second example ALF filter 416 filter (identified by CHROMA ALF). The first ALF filter 410 is an ALF filter that processes luma samples, such as the processed luma samples 408 from the SAO luma filter 402. The first CC-ALF filter 412 is a CC-ALF filter that cross-correlates luma samples (e.g., the processed luma samples 408 from the SAO luma filter 402) and Cb samples. The second CC-ALF filter 414 is a CC-ALF filter that cross-correlates luma samples (e.g., the processed luma samples 408 from the SAO luma filter 402) and Cr samples. The second ALF filter 416 is an ALF filter that processes Cb samples from the SAO Cb filter 404 and Cr samples from the SAO Cr filter 406.

During the encoder process, an encoder (e.g., the encoder 108) can generate filter coefficients and provide the filter coefficients to a decoder (e.g., the decoder 114). In some examples, the first ALF filter 410 and the second ALF filter 416 can be implemented using symmetric diamond shapes for luma and chroma filtering. Example implementations of the first ALF filter 410 and the second ALF filter 416 are depicted in the illustrated example of FIG. 6.

Figure 6:
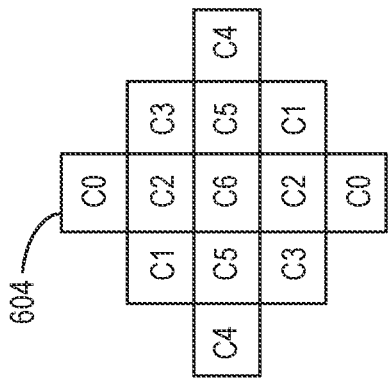
FIG. 6 is an illustration of an example implementation of the chrominance adaptive loop filter and the luminance adaptive loop filter of FIGS. 4 and/or 5.
Figure 6:
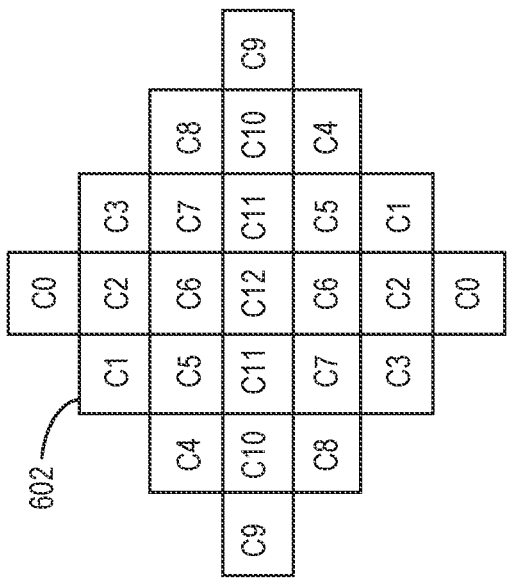

Turning to the illustrated example of FIG. 6, a first example ALF filter 602 and a second example ALF filter 604 are depicted. In some examples, the first ALF filter 602 can implement the first ALF filter 410 of FIG. 4. In some examples, the second ALF filter 604 can implement the second ALF filter 416. In some examples, the first ALF filter 602 and/or the second ALF filter 604 can implement one(s) of the filter(s) 388 of FIG. 3.

The first ALF filter 602 has a 7×7 diamond shape supported for luma components. For example, each square of the first ALF filter 602 corresponds to a luma sample and the center square corresponds to a current-to-be-filtered sample. The second ALF filter 604 has a 5×5 diamond shape supported for chroma components. For example, each square of the second ALF filter 604 corresponds to a chroma sample and the center square corresponds to a current-to-be-filtered sample.

In some examples, to reduce the signaling overhead and the number of multiplications, the filter coefficients of the first ALF filter 602 and the second ALF filter 604 use point symmetry. In some examples, the filter coefficients of the first ALF filter 602 and/or the second ALF filter 604 can implement one(s) of the coefficient(s) 386 of FIG. 3. For example, each integer filter coefficient $c_i$ can be represented with 7-bit fractional precision (or a different fractional precision). In some such examples, the sum of coefficients of one filter can be equal to 128, which is the fixed-point representation of 1.0 with 7-bit fractional precision, to preserve DC neutrality. The sum of coefficients is represented by the example of Equation (1) below. In Equation (1), the number of coefficients N is equal to 7 for the 5×5 filter shape (e.g., $c_0$-$c_6$) of the first ALF filter 602 and 13 for the 7×7 filter shape (e.g., $c_0$-$c_{12}$) of the second ALF filter 604.

$$2\Sigma_{i=0}^{N-2} c_i + c_{N-1} = 128, \quad \text{Equation (1)}$$

In some examples, the filtering for one pixel can be described with the example of Equation (2) below:

$$O'(x,y) = I(x,y) + \Sigma_{(i,j)\neq(0,0)} w(i,j) \cdot (I(x+i,y+j) - I(x,y)), \quad \text{Equation (2)}$$

In the illustrated example of Equation (2) above, $I(x,y)$ is the pixel value (e.g., a luma value, a chroma value, etc.) to be filtered and $w(i,j)$ are the filter coefficients (e.g., $c_i$). A value based on the summation over the filter shape can be a compensation value to be added to $I(x,y)$ to yield the original pixel value (e.g., a pixel value in the coding block 218, portion(s) of the input image 216, etc.).

To reduce the filtering impact of neighboring pixels, clipping is applied to the differences between a current pixel and neighboring pixels based on the example of Equation (3) below:

$$O'(x,y) = I(x,y) + \Sigma_{(i,j)\neq(0,0)} w(i,j) \cdot K(I(x+i,y+j) - I(x,k(i,j))), \quad \text{Equation (3)}$$

In the illustrated example of Equation (3) above, $K(d,b) = \min(b, \max(-b, d))$ and $k(i,j)$ are the clipping parameters signaled in a bitstream, such as the bitstream 228.

Turning to the illustrated example of FIG. 7, a table 700 depicts how clipping parameters are determined for the corresponding indices (identified by clipIdx) with respect to bit depth (identified by BitDepth). For example, for each signaled luma ALF filter and chroma ALF filter, one set of $k(i,j)$ is signaled. In some examples, the encoder 108 derives a clipping value index for the filter coefficients. For example, for each luma ALF filter, 12 clipping value indices can be signaled (e.g., one index for one filter coefficient position). In some examples, for each chroma ALF filter, 6 clipping value indices can be signaled (e.g., one index for one filter coefficient position). In some examples, since each coefficient can have 4 different clipping options, the total filter combinations are substantial (e.g., total filter combinations=$4^{12}+4^6$) and may be impractical to search through the total filter combinations with an exhaustive search. Advantageously, examples described herein can reduce the total number of filter combinations by executing the machine learning model 382 to generate a relatively small number of clipping index set candidates to search through.

Turning back to the illustrated example of FIG. 6, in some examples, each of the coefficients of the first ALF filter 602 and/or the second ALF filter 604 can have a corresponding clipping index. In some examples, the generated clipping indices follow the rule of distance, where the index of a coefficient far from the center of the filter is equal or larger than the index of a coefficient far closer to the center. For example, in the first ALF filter 602, $c_{12}$ is the center position. In some such examples, a first clipping coefficient corresponding to $c_0$ and a second clipping coefficient corresponding to $c_{11}$ can have the two smallest indices of the clipping index set candidate that includes the first clipping coefficient and the second clipping coefficient.

Turning back to the illustrated example of FIG. 4, the first CC-ALF filter 412 and the second CC-ALF filter 414 use the processed luma samples 408 to refine the chroma sample values within the ALF filter 238. In the illustrated example, the first CC-ALF filter 412 and the second CC-ALF filter 414 implement linear filtering operation(s) to take the processed luma samples 408 as inputs and generates example correction values 418, 420 for the chroma sample values as outputs. For example, the first CC-ALF filter 412 can generate a first example correction value 418 (identified by $\Delta I_1$) and the second CC-ALF filter 414 can generate a second example correction value 420 (identified by $\Delta I_2$).

In some examples, the first CC-ALF filter 412 and the second CC-ALF filter 414 have 3×4 diamond filter shapes with 7 filter coefficients to be signaled in the bitstream 228. In some examples, the first CC-ALF filter 412 and the second CC-ALF filter 414 can each be implemented by the example of Equation (4) below:

$$\Delta I_i(x,y) = \Sigma_{(x_n,y_n)\in S_i} I_0(x_Y + x_0, y_Y + y_0) c_i(x_0, y_0), \quad \text{Equation (4)}$$

In the illustrated example of Equation (4) above, $(x,y)$ is the sample location of the chroma component i, $(x_Y, y_Y)$ is the luma sample location derived from $(x,y)$, $(x_0, y_0)$ are the filter support offset around $(x_Y, y_Y)$, $S_i$ is the filter support region in luma for the chroma component i, and $c_i(x_0, y_0)$ represents the filter coefficients of the component i. The luma location $(x_Y, y_Y)$ is determined based on the spatial scaling factor between the chroma and luma planes. The sample values in the luma support region are also inputs to the luma ALF stage and correspond to the output of the SAO stage. In some examples, the first correction value 418 and the second correction value 420 can be determined using Equation (4) above.

In some examples, up to 4 alternative CC-ALF filters are signaled for Cb and Cr, respectively, in one APS data structure. In some examples, separate CC-ALF control flags and APS IDs are signaled in a picture header or sequence header for Cb and Cr. For example, a first CC-ALF control flag and a first APS ID corresponding to the first CC-ALF filter 412 can be signaled. In some examples, a second CC-ALF control flag and a second APS ID corresponding to the second CC-ALF filter 414 can be signaled. In some examples, separate CTB level filter control flags and filter indices are signaled for Cb and Cr. For example, a first CTB level filter control flag and a first filter index corresponding to the first CC-ALF filter 412 can be signaled. In some examples, a second CTB level filter control flag and a second filter index corresponding to the second CC-ALF filter 414 can be signaled.

In example operation, the first ALF filter 410 outputs a corrected luma value Y based on the processed luma samples 408. The second ALF filter 416 outputs a first interim corrected chroma sample Cb' to a first adder 422 and a second interim corrected chroma sample Cr' to a second adder 424. The first adder 422 outputs a first corrected chroma sample Cb to the buffer 240 based on Cb' and the first correction value 418. The second adder 424 outputs a second corrected chroma sample Cr to the buffer 240 based on Cr' and the second correction value 420. In example operation, the buffer 240 can provide Y, Cr, and Cb to the motion estimation block 210 and the inter prediction mode block 242 of FIG. 2.

In some examples, when generating a filter set (e.g., a luma set for the first ALF filter 410, a chroma set for the second ALF filter 416), the ALF filter 238 first calculates a filter for each of the classes (e.g., the 25 luma classes for the first ALF filter 410). For example, the first ALF filter 410 can apply a merging algorithm to these 25 filters. In each iteration, by merging two filters, the first ALF filter 410 can execute the merging algorithm to reduce the number of filters by 1. In some examples, to determine which two filters should be merged, for every pair of the remaining filters, the first ALF filter 410 can redesign a filter by merging two filters and the corresponding pixel data, respectively. Using the redesigned filter, the first ALF filter 410 can estimate the distortion. The first ALF filter 410 can merge the pair with the smallest distortion. In some examples, 25 filter sets are obtained, the first set having 25 filters, the second one 24 filters, and so on until the 25th one contains a single filter. The first ALF filter 410 can select the set that minimizes rate-distortion cost, including bits required to code filter coefficients. The second ALF filter 416 can similarly select a set of filters that minimizes rate-distortion cost by calculating a filter for each class and applying a merging algorithm to the classes.

When generating a filter (e.g., the first ALF filter 410, the second ALF filter 416, etc.), the clipping indices and the N−1 filter coefficients are calculated iteratively by the ALF filter 238 until there is no decrease of the square error. For example, the ALF circuitry 300 of FIG. 3 can generate a clipping index set candidate including the clipping indices as described herein. In each iteration, the values of the clipping indices are updated one by one, starting with index d0 and continuing until index dN−2 is reached. In some examples, when updating the index, up to 3 options are tested: keeping its value unchanged, increasing by 1 (or a different value) or decreasing by 1 (or a different value). For example, the first ALF filter 410 can calculate the filter coefficients and the approximate distortion for these 3 values and the value that minimizes square error is selected. At the start of the first iteration the values of clipping indices are initialized to 2, or when merging two filters, the value of di is set to the average of the corresponding clipping indices for these filters.

Figure 5:
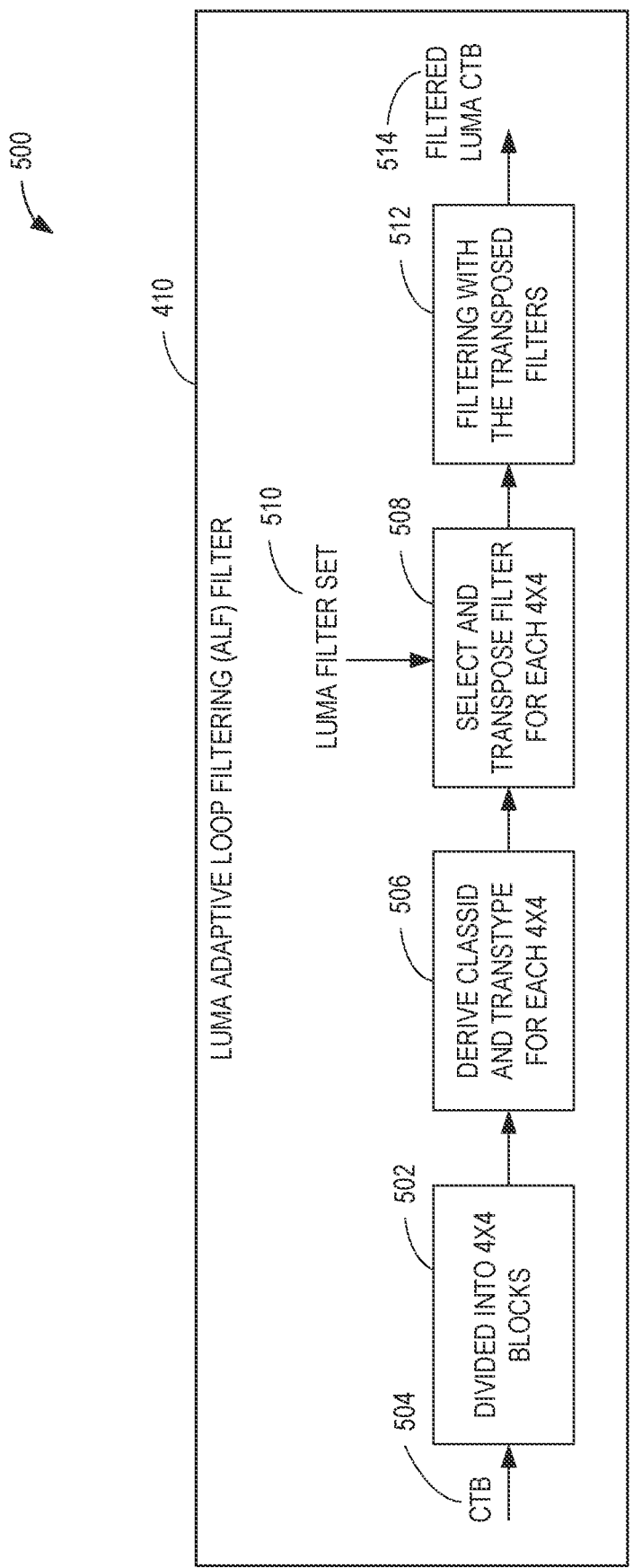
FIG. 5 is a block diagram of an example workflow to implement the luminance adaptive loop filter of FIG. 4.

FIG. 5 is a block diagram of an example workflow 500 to implement the luma ALF filter 410 of FIG. 4. During a first operation 502, the luma ALF filter 410 receives an example CTB 504. For example, the CTB 504 can be a luma sample of a CTU. During the first operation 502, the luma ALF filter 410 divides the CTB 504 into sub blocks, such as 4×4 blocks. During a second operation 506, the luma ALF filter 410 derives a class identification (identified by CLASSID) and a transform type (identified by TRANSTYPE) for each of the 4×4 blocks. For example, 25 classes (or a different number of classes) can be defined based on the local sample gradients of the 4×4 blocks. In some examples, 4 transpose types can be defined to transpose the filter coefficients before they are applied to filter the corresponding 4×4 blocks. For example, the transpose types can include geometric transformations such as 90-degree rotation, diagonal, or vertical flip within the filter shape.

During a third operation 508, the luma ALF filter 410 receives a luma filter set 510, such as a set of 25 filters. For example, there can be one filter for each of the classes defined in the second operation 506. During the third operation 508, the luma ALF filter 410 selects and transposes one(s) of the luma filter set 510 for each of the 4×4 blocks. During a fourth operation 512, the luma ALF filter 410 filters the 4×4 blocks of the CTB 504 with the transposed filters to output a filtered luma CTB 514. In some examples, the luma ALF filter 410 can output the filtered luma CTB 514 to the buffer 240.

In some examples, to reduce the APS syntax overhead of signaling all 25 luma filters, the encoder 108 can adaptively merge block classes to use the same filter to minimize rate distortion cost, and then signal one(s) of the following parameters in APS: the number of different filters used for the new filter set, clipping coefficient(s), clipping index(es), clipping index set(s), the coefficients of the finally used filters, which signaled filter should be used for a particular class, etc.

Flowcharts representative of example hardware logic circuitry, machine readable instructions, hardware implemented state machines, and/or any combination thereof for implementing the ALF circuitry 300 of FIG. 3 are shown in FIGS. 8-11. The machine readable instructions may be one or more executable programs or portion(s) of an executable program for execution by processor circuitry, such as the processor circuitry 1212 shown in the example processor platform 1200 discussed below in connection with FIG. 12 and/or the example processor circuitry discussed below in connection with FIGS. 13 and/or 14. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowchart illustrated in FIGS. 8-11, many other methods of implementing the example ALF circuitry 300 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 8-11 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium are expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

Figure 8:
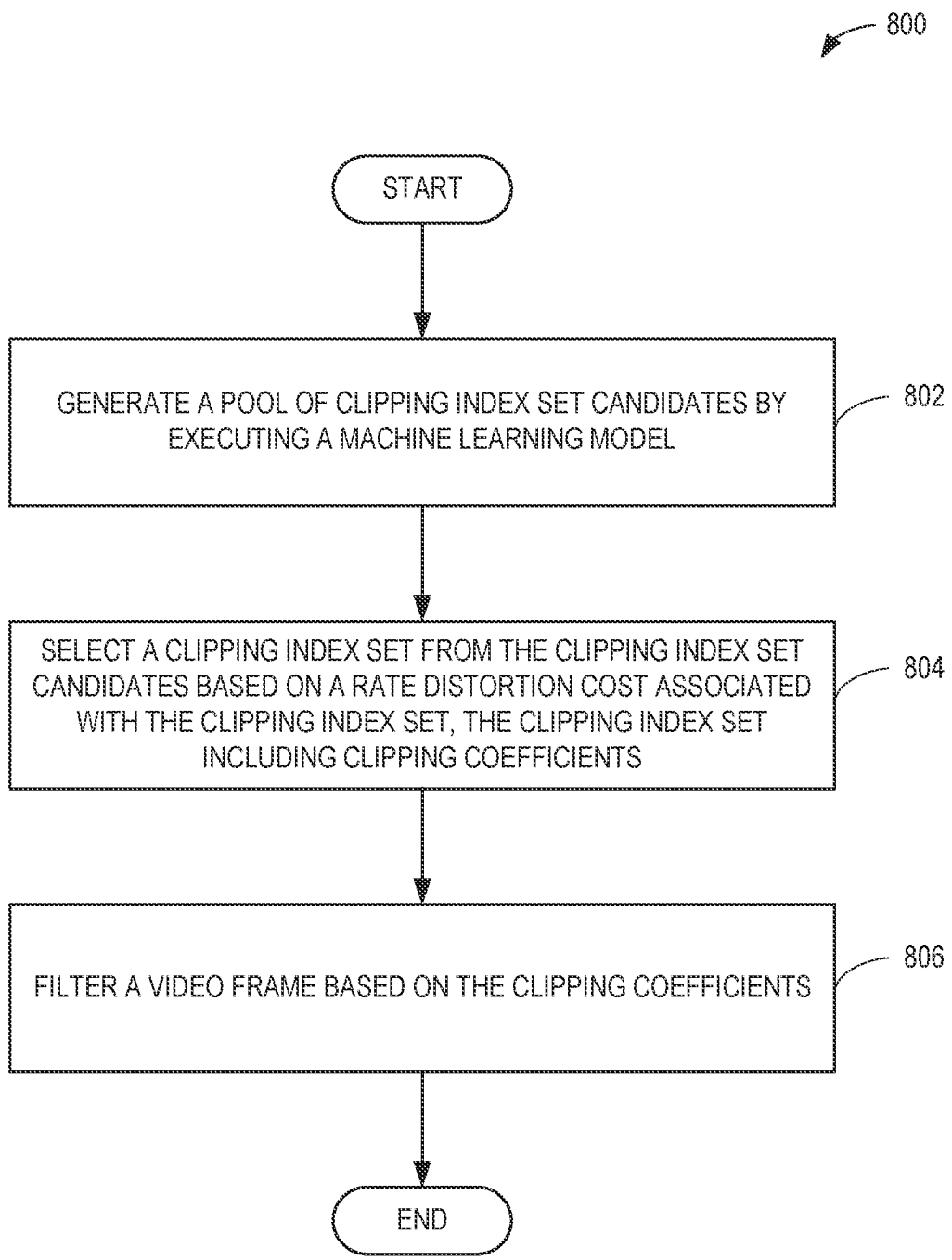
FIG. 8 is a flowchart representative of example machine readable instructions and/or example operations that may be executed and/or instantiated by example processor circuitry to implement the adaptive loop filter circuitry of FIGS. 2 and/or 3 to filter a video frame based on clipping coefficients.

FIG. 8 is a flowchart representative of example machine readable instructions and/or example operations 800 that may be executed and/or instantiated by processor circuitry to filter a video frame based on clipping coefficients. The machine readable instructions and/or the operations 800 of FIG. 8 begin at block 802, at which the ALF circuitry 300 generates a pool of clipping index set candidates by executing a machine learning model. For example, the clipping index set generation circuitry 340 (FIG. 3) can execute the machine learning model 382 (FIG. 3) using training data as model input(s) to generate model output(s), which can include a pool of clipping index set candidates. In some examples, the clipping index set generation circuitry 340 can execute the trained instance of the machine learning model 382 with a video frame, or characteristics and/or portion(s) thereof, as model input(s) to generate model output(s), which can include one or more clipping index sets (e.g., clipping index set candidates) from the pool of the clipping index set candidates.

At block 804, the ALF circuitry 300 selects a clipping index set from the clipping index set candidates based on a rate distortion cost associated with the clipping index set, and the clipping index set candidates including clipping coefficients. For example, the clipping index set selection circuitry 350 (FIG. 3) can select a first clipping index set candidate from the one or more clipping index candidates. In some such examples, the clipping index set selection circuitry 350 can select the first clipping index set candidate based on the first clipping index set candidate being associated with the lowest and/or otherwise minimized rate distortion cost with respect to other(s) of the one or more clipping index set candidates not selected.

At block 806, the ALF circuitry 300 filters a video frame based on the clipping coefficients. For example, the filter circuitry 370 (FIG. 3) can generate the first ALF filter 410 and/or the second ALF filter 416 of FIG. 4 based on the clipping coefficients of the first clipping index set candidate. In some such examples, the filter circuitry 370 can generate the first ALF filter 410 by applying a clipping coefficient of the first clipping index set candidate to a corresponding one of the coefficients of the first ALF filter 602 of FIG. 6. In some examples, the filter circuitry 370 can generate the second ALF filter 416 by applying a clipping coefficient of the first clipping index set candidate to a corresponding one of the coefficients of the second ALF filter 604 of FIG. 6. In some examples, the filter circuitry 370 can output the filtered video frame to the entropy coding block 208 of FIG. 2 for encoding and/or otherwise insertion into the bitstream 228 of FIG. 2. For example, a decoder, such as the decoder 114 of FIG. 1, can receive the clipping coefficients and decode the encoded video frame using the received clipping coefficients. In response to filtering the video frame based on the clipping coefficients at block 806, the example machine readable instructions and/or the operations 800 of FIG. 8 conclude.

Figure 9:
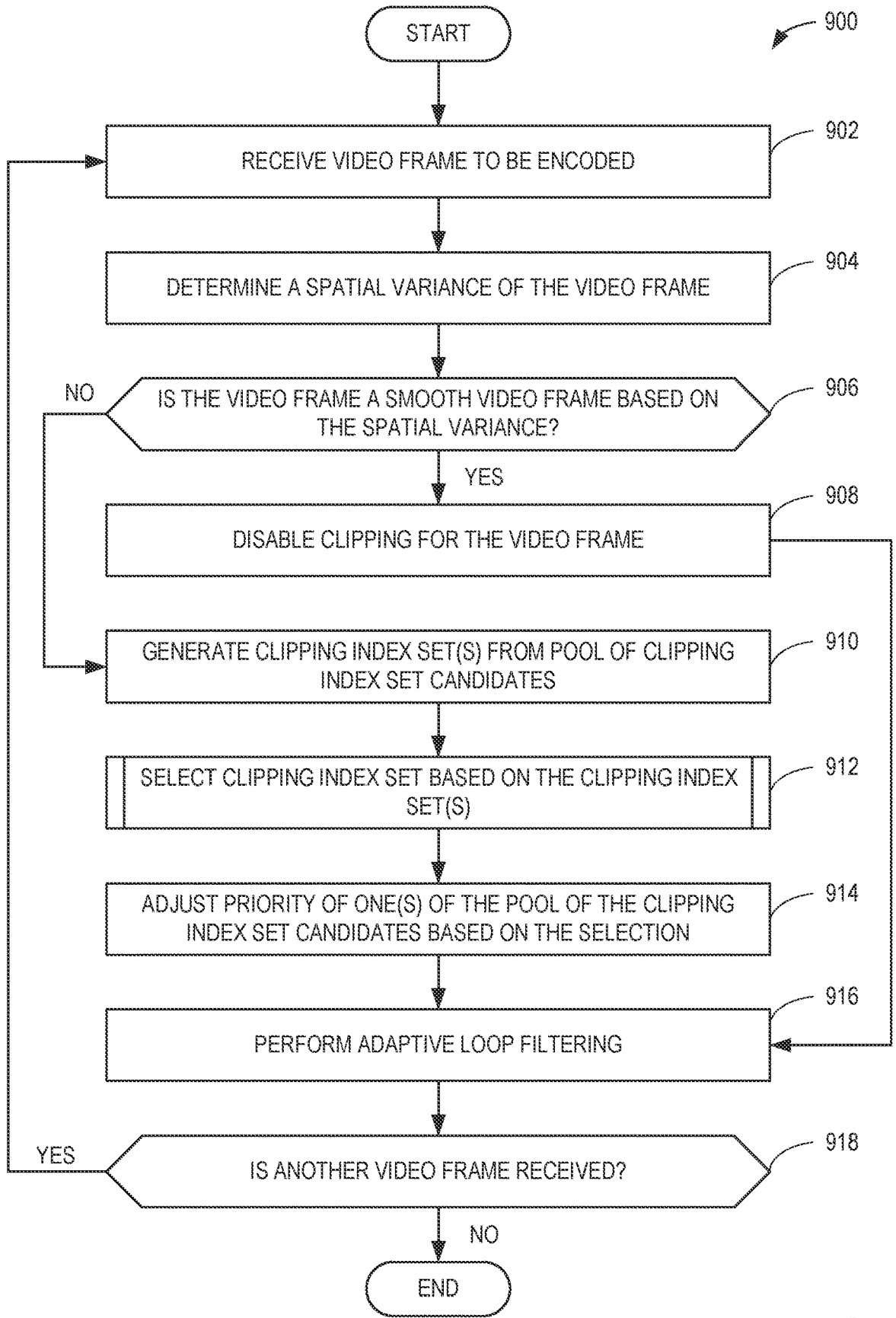
FIG. 9 is another flowchart representative of example machine readable instructions and/or example operations that may be executed and/or instantiated by example processor circuitry to implement the adaptive loop filter circuitry of FIGS. 2 and/or 3 to filter a video frame based on clipping coefficients.

FIG. 9 is another flowchart representative of example machine readable instructions and/or example operations 900 that may be executed and/or instantiated by processor circuitry to filter a video frame based on filter coefficients. The machine readable instructions and/or the operations 900 of FIG. 9 begin at block 902, at which the ALF circuitry 300 receives a video frame to be encoded. For example, the interface circuitry 310 (FIG. 3) can receive the input image 216 of FIG. 2. In some such examples, the interface circuitry 310 can receive pixel data, such as the luma samples 408 and/or chroma samples from the SAO filter 236

At block 904, the ALF circuitry 300 determines a spatial variance of the video frame. For example, the spatial variance determination circuitry 330 (FIG. 3) can determine a spatial variance of the input image 216.

At block 906, the ALF circuitry 300 determines whether the video frame is a smooth video frame based on the spatial variance. For example, the spatial variance determination circuitry 330 can determine that the input image 216 is a smooth image because the spatial variance is less than a threshold (e.g., a variance threshold, a spatial variance threshold, etc.).

If, at block 906, the ALF circuitry 300 determines that the video frame is a smooth video frame based on the spatial variance, then, at block 908, the ALF circuitry 300 disables clipping for the video frame. For example, the clipping index set selection circuitry 350 (FIG. 3) can disable clipping for the input image 216, which can include not using clipping coefficients in connection with the first ALF filter 602 and/or the second ALF filter 604 of FIG. 6. In response to disabling clipping for the video frame at block 908, control proceeds to block 916.

If, at block 906, the ALF circuitry 300 determines that the video frame is not a smooth video frame based on the spatial variance, control proceeds to block 910 to generate clipping index set(s) from a pool of clipping index set candidates. For example, the clipping index set generation circuitry 340 (FIG. 3) can generate and/or identify one or more clipping index sets (e.g., clipping index set candidates) from a pool of clipping index set candidates by executing and/or otherwise cause an execution of the machine learning model 382 with the video frame, or characteristic(s) (e.g., pixel data, a spatial variance, a temporal variance, etc.) and/or portion(s) (e.g., a CTB, a slice, etc.) thereof, as model input(s).

At block 912, the ALF circuitry 300 selects a clipping index set based on the clipping index set(s). For example, the clipping index set selection circuitry 350 can select a first clipping index set from the one or more clipping index set candidates. An example process that may be performed to implement block 912 is described below in connection with FIG. 10.

At block 914, the ALF circuitry 300 adjusts a priority of one(s) of the pool of the clipping index set candidates based on the selection. For example, the clipping index adjustment circuitry 360 (FIG. 3) can increase a priority of the first clipping index set because the first clipping index set is selected to clip, process, and/or otherwise filter the input image 216. In some examples, the clipping index adjustment circuitry 360 can decrease a priority of one or more clipping index sets of the pool of the clipping index sets because the one or more clipping index sets are not selected to clip, process, and/or otherwise filter the input image 216.

At block 916, the ALF circuitry 300 performs adaptive loop filtering. For example, the filter circuitry 370 (FIG. 3) can filter the input image, or portion(s) thereof, using the first ALF filter 410, the second ALF filter 416, the first ALF filter 602, and/or the second ALF filter 604 using the clipping coefficients of the first clipping index set. In some examples, the filter circuitry 370 can output the filtered input image 216, or filtered portion(s) thereof), to the entropy coding block 208 to be signaled to a decoder, such as the decoder 114 of FIG. 1. For example, the filter circuitry 370 can output the clipping coefficients, the clipping index set, an identifier corresponding to the clipping index set, etc., to the entropy coding block 208 to be included in the bitstream 228.

At block 918, the ALF circuitry 300 determines whether another video frame is received. For example, the interface circuitry 310 can determine another that another input image, or portion(s) thereof, is/are received to be encoded in the bitstream 228. If, at block 918, the ALF circuitry 300 determines that another video frame is received, control returns to block 902, otherwise the example machine readable instructions and/or the operations 900 conclude.

Figure 10:
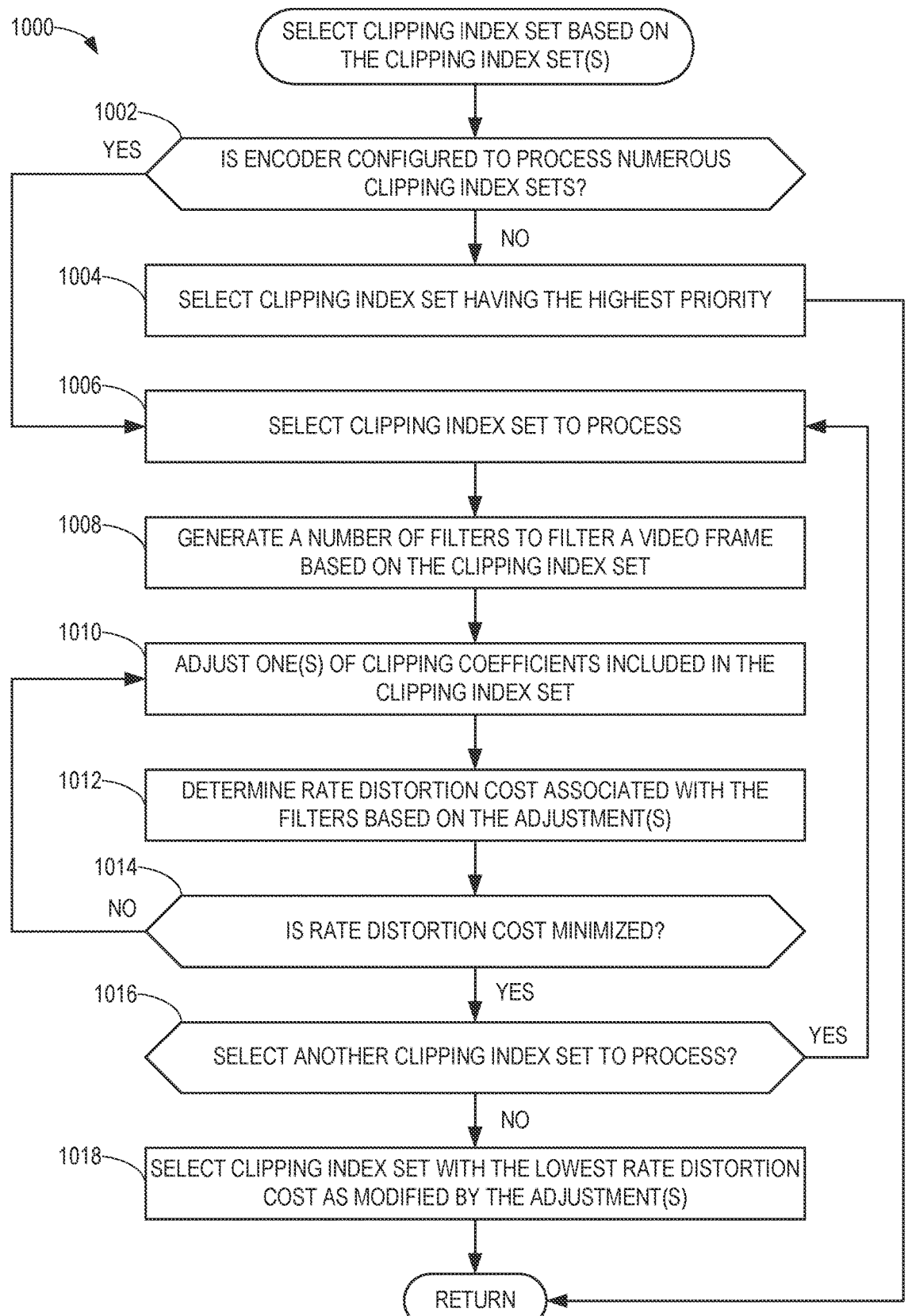
FIG. 10 is a flowchart representative of example machine readable instructions and/or example operations that may be executed and/or instantiated by example processor circuitry to implement the adaptive loop filter circuitry of FIGS. 2 and/or 3 to select a clipping index set based on clipping index set candidate(s).

FIG. 10 is a flowchart representative of example machine readable instructions and/or example operations 1000 that may be executed and/or instantiated by processor circuitry to select a clipping index set based on clipping index set candidate(s). In some examples, the example machine readable instructions and/or example operations 1000 may be executed and/or instantiated by processor circuitry to implement block 912 of FIG. 9. The machine readable instructions and/or the operations 1000 of FIG. 10 begin at block 1002, at which the ALF circuitry 300 determines whether an encoder is configured to process numerous clipping index sets. For example, the clipping index set selection circuitry 350 (FIG. 3) can determine whether the encoder 108 of FIGS. 1 and/or 2 is configured and/or otherwise adapted to process numerous clipping index sets (e.g., 5, 10, 20, 50, etc., clipping index sets), which can be indicative of the encoder 108 to encode video with higher video quality. In some such examples, the encoder 108 can encode video with higher video quality by effectuating a high-quality non-linear clipping index determination technique as described herein. In some examples, the clipping index set selection circuitry 350 can determine whether the encoder 108 is configured and/or otherwise adapted to process a relatively few number of clipping index sets (e.g., 1, 2, etc., clipping index sets), which can be indicative of the encoder 108 to encode video with lower video quality but with reduced complexity and thereby improved efficiency (e.g., increased throughput, reduced latency, etc., of the encoder 108). In some such examples, the encoder 108 can encode video with reduced complexity by effectuating a low-complexity non-linear clipping index determination technique as described herein. In some examples, the clipping index set selection circuitry 350 can determine whether the encoder 108 is configured to implement the high-quality non-linear clipping index determination technique or the low-complexity non-linear clipping index determination technique based on a value of a parameter, a flag, a variable, etc., associated with the encoder 108.

If, at block 1002, the ALF circuitry 300 determines that the encoder is not configured to process numerous clipping index sets, control proceeds to block 1004. At block 1004, the ALF circuitry 300 selects a clipping index set having the highest priority. For example, the clipping index set selection circuitry 350 can identify a first clipping index set as having the highest priority (or being ranked the highest in terms of likelihood of being selected for clipping, processing, filtering, etc., a video frame) from a pool of clipping index set candidates. Advantageously, the clipping index set selection circuitry 350 can achieve improved efficiency by identifying the first clipping index set candidate based on its priority and reduce further computational and/or memory requirements by ceasing a search of other clipping index sets. In response to selecting the clipping index set having the highest priority at block 1004, the example machine readable instructions and/or the operations 1000 of FIG. 10 conclude. For example, the machine readable instructions and/or the operations 1000 of FIG. 10 can return to block 914 of FIG. 9 to adjust a priority of one(s) of the pool of the clipping index set candidates based on the selection.

If, at block 1002, the ALF circuitry 300 determines that the encoder is configured to process numerous clipping index sets, control proceeds to block 1006. At block 1006, the ALF circuitry 300 selects a clipping index set to process. For example, the clipping index set selection circuitry 350 can obtain the pool or collection of the clipping index set candidates as outputs from the machine learning model 382. In some such examples, the clipping index set selection circuitry 350 can select a first clipping index set of the pool of the clipping index set candidates.

At block 1008, the ALF circuitry 300 generates a number of filters to filter a video frame based on the clipping index set. For example, the filter circuitry 370 (FIG. 3) can generate and/or otherwise derive 25 filters for the luma filter set 510 of FIG. 5 based on the clipping coefficients included in the first clipping index set.

At block 1010, the ALF circuitry 300 adjusts one(s) of clipping coefficients included in the clipping index set. For example, the clipping index adjustment circuitry 360 (FIG. 3) can increment or decrement one(s) of a chroma clipping (CC) index set of {CC0, CC1, CC2, CC3, CC4, CC5}, one(s) of a luma clipping (LC) index set of {LC0, LC1, LC2, LC3, LC4, LC5, LC6, LC7, LC8, LC9, LC10, LC11}, etc., and/or any combination(s) thereof, to generate a first combination of CC coefficients, a first combination of LC coefficients, etc.

At block 1012, the ALF circuitry 300 determines a rate distortion cost associated with the filters based on the adjustment(s). For example, the clipping index adjustment circuitry 360 (FIG. 3) can determine a rate distortion cost associated with filtering a video frame to be encoded using the determined filters. In some such examples, the clipping index adjustment circuitry 360 can determine the rate distortion cost by calculating an amount or quantity of distortion (e.g., a loss of video quality) with respect to the amount or quantity of data required to encode the video frame.

At block 1014, the ALF circuitry 300 determines whether the rate distortion cost is minimized. For example, the clipping index adjustment circuitry 360 (FIG. 3) can determine whether the calculated rate distortion cost for the first combination of CC coefficients, the first combination of LC coefficients, etc., is less than a previously calculated rate distortion cost for previously generated CC and/or LC coefficient combinations.

If, at block 1014, the ALF circuitry 300 determines that the rate distortion cost is not minimized, control returns to block 1010 to adjust one(s) of the clipping coefficients included in the clipping index set. For example, the clipping index adjustment circuitry 360 can increment or decrement one(s) of the CC index set of {CC0, CC1, CC2, CC3, CC4, CC5}, one(s) of the LC index set of {LC0, LC1, LC2, LC3, LC4, LC5, LC6, LC7, LC8, LC9, LC10, LC11}, etc., and/or any combination(s) thereof, to generate a second combination of CC coefficients, a second combination of LC coefficients, etc. In some such examples, the clipping index adjustment circuitry 360 can calculate the rate distortion cost associated with the second combination(s) and determine whether the rate distortion cost associated with the second combination(s) are greater than or less than the rate distortion cost associated with the first combination(s). For example, the clipping index adjustment circuitry 360 can determine that the rate distortion cost is not minimized in response to determining that the rate distortion cost associated with the second combination(s) is less than the rate distortion cost associated with the first combination(s). In some examples, the clipping index adjustment circuitry 360 can determine that the rate distortion cost is minimized (or possibly or potentially minimized) in response to determining that the rate distortion cost associated with the second combination(s) is greater than the rate distortion cost associated with the first combination(s). For example, the clipping index adjustment circuitry 360 can iteratively generate new combination(s) and calculate new rate distortion cost(s) until the clipping index adjustment circuitry 360 determines that the rate distortion cost is minimized.

If, at block 1014, the ALF circuitry 300 determines that the rate distortion cost is minimized, control proceeds to block 1016. At block 1016, the ALF circuitry 300 determines whether to select another clipping index set to process. For example, the clipping index set selection circuitry 350 can select a second clipping index set of the pool of the clipping index set candidates to process. If, at block 1016, the ALF circuitry 300 determines to select another clipping index set to process, control returns to block 1006, otherwise control proceeds to block 1018.

At block 1018, the ALF circuitry 300 selects the clipping index set with the lowest rate distortion cost as modified by the adjustment(s). For example, the clipping index set selection circuitry 350 can select the first clipping index set in response to determining that the first clipping index set has the lowest rate distortion cost with respect to other one(s) of the pool of the clipping index set candidates. In some such examples, the clipping index set selection circuitry 350 can select the first clipping index set based on the increment(s), decrement(s), and/or otherwise adjustment(s) of the clipping coefficients to reduce the rate distortion cost. In response to selecting the clipping index set with the lowest rate distortion cost as modified by the adjustment(s) at block 1018, the example machine readable instructions and/or the operations 1000 of FIG. 10 conclude. For example, the machine readable instructions and/or the operations 1000 of FIG. 10 can return to block 914 of FIG. 9 to adjust a priority of one(s) of the pool of the clipping index set candidates based on the selection.

Figure 11:
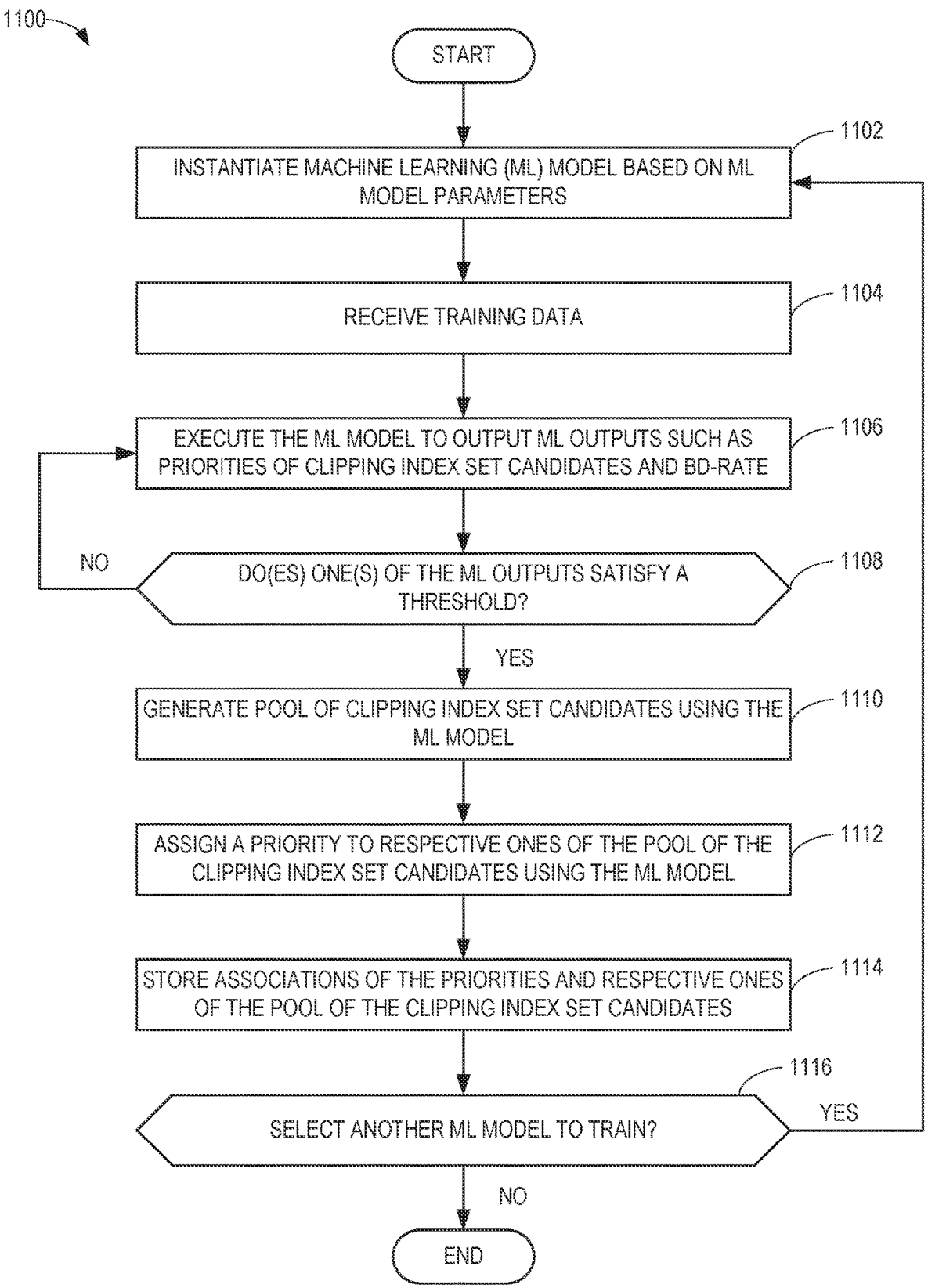
FIG. 11 is a flowchart representative of example machine readable instructions and/or example operations that may be executed and/or instantiated by example processor circuitry to implement the adaptive loop filter circuitry of FIGS. 2 and/or 3 to train and execute a machine learning model to generate a pool of clipping index set candidates.

FIG. 11 is a flowchart representative of example machine readable instructions and/or example operations 1100 that may be executed and/or instantiated by processor circuitry to train and execute a machine learning model to generate a pool of clipping index set candidates. The machine readable instructions and/or the operations 1100 of FIG. 11 begin at block 1102, at which the ALF circuitry 300 instantiates a machine learning (ML) model based on ML model parameters. For example, the machine learning circuitry 320 (FIG. 3) can instantiate and/or otherwise generate the machine learning model 382. In some such examples, the machine learning model 382 can be implemented using a neural network model based on neural network parameters, which can include hyperparameters.

At block 1104, the ALF circuitry 300 receives training data. For example, the interface circuitry 310 (FIG. 3) can receive training data from external or local sources. In some examples, the training data can include a pool or collection of media, which can include video frames.

At block 1106, the ALF circuitry 300 executes the ML model to output ML outputs such as priorities of clipping index set candidates and a BD-rate. For example, the machine learning circuitry 320 can execute the machine learning model 382 using the training data as model inputs to output model outputs, which can include clipping index set candidates. In some such examples, the model outputs can include a priority corresponding to a respective one of the clipping index set candidates. In some examples, the model outputs can include a BD-rate associated with a respective one of the clipping index set candidates.

At block 1108, the ALF circuitry 300 determines whether one(s) of the ML outputs satisfies a threshold. For example, the machine learning circuitry 320 can determine whether an accuracy of the machine learning model 382 satisfies a threshold (e.g., an accuracy or error threshold), a BD-rate associated with one(s) of the clipping index set candidates satisfies a threshold (e.g., a BD-rate threshold), etc., and/or any combination(s) thereof. In some examples, the machine learning circuitry 320 can determine that a satisfaction of a threshold can be indicative of the machine learning model 382 being sufficiently trained to be deployed in operation to produce useful model outputs with satisfactory confidence.

If, at block 1108, the ALF circuitry 300 determines that one(s) of the ML output(s) do not satisfy a threshold, control returns to block 1106, otherwise control returns to block 1110 to generate a pool of clipping index set candidates using the ML model. For example, the clipping index set generation circuitry 340 (FIG. 3) can execute the machine learning model 382 to generate a pool of clipping index set candidates. In some such examples, the clipping index set candidates can be implemented by sets of clipping coefficients.

At block 1112, the ALF circuitry 300 assigns a priority to respective ones of the pool of the clipping index set candidates. For example, the clipping index set generation circuitry 340 can assign a priority to respective ones of the pool of the clipping index set candidates based on a likelihood that a particular clipping index set candidate is to be selected for clipping, processing, filtering, etc., a video frame. In some such examples, the machine learning model 382 can identify one(s) of the clipping index set candidates in the pool as having a priority that satisfies a threshold (e.g., a priority threshold, a priority floor, etc.). In some examples, the machine learning model 382 can remove one(s) from the pool that have a priority less than the threshold (e.g., having a priority that does not satisfy the threshold).

At block 1114, the ALF circuitry 300 stores associations of the priorities and respective ones of the pool of the clipping index set candidates. For example, the clipping index set generation circuitry 340 can store the clipping index set(s) in the pool and their corresponding priorities in the clipping index set(s) 384 of the datastore 380 (FIG. 3).

At block 1116, the ALF circuitry 300 determines whether to select another ML model to train. For example, the machine learning circuitry 320 can determine whether to select another type of ML model, such as a reinforcement learning model, to train to select clipping index set candidates. If, at block 1116, the ALF circuitry 300 determines to select another ML model to train, control returns to block 1102, otherwise the example machine readable instructions and/or the operations 1100 of FIG. 11 conclude.

Figure 12:
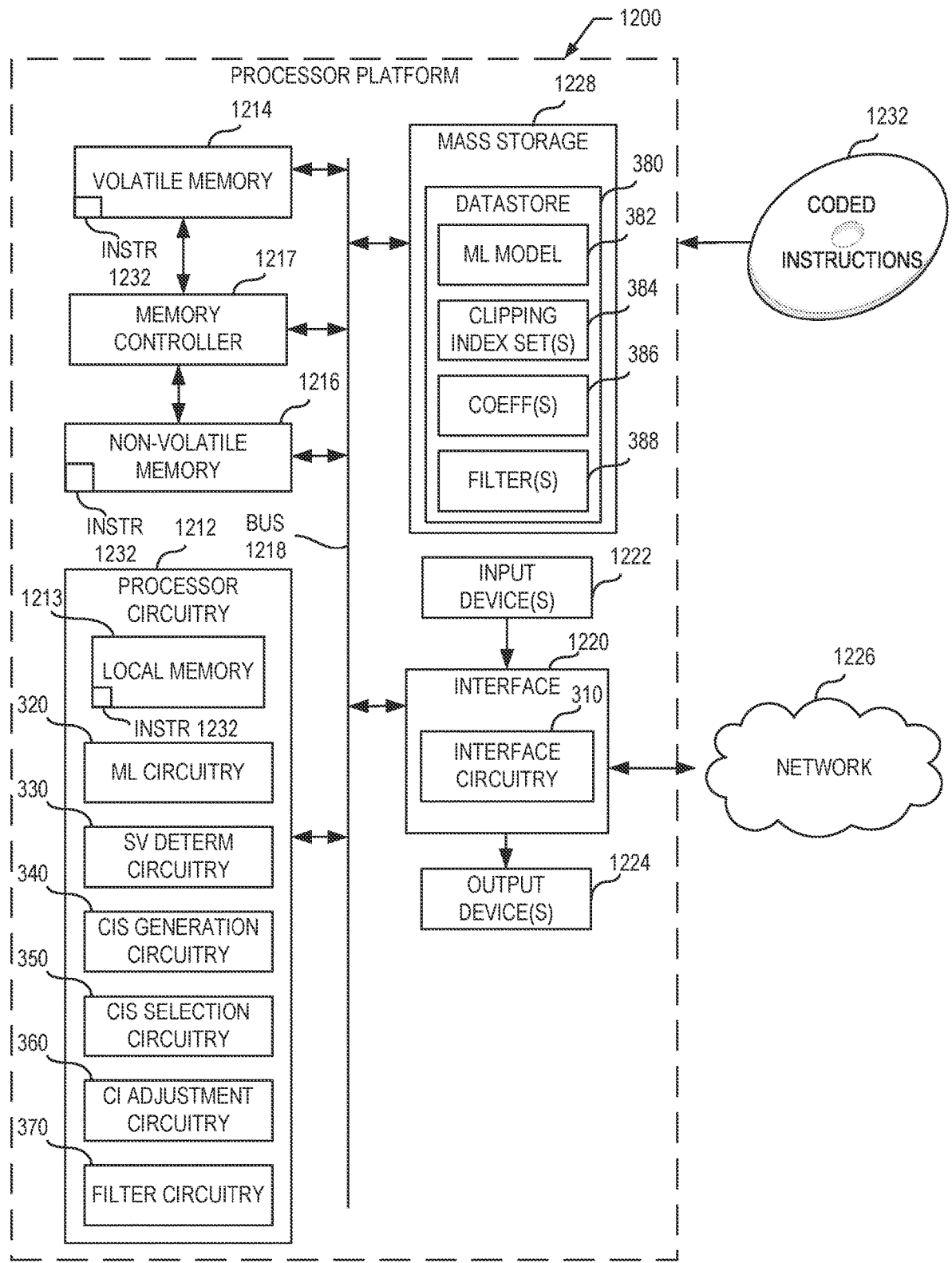
FIG. 12 is a block diagram of an example processing platform including processor circuitry structured to execute the example machine readable instructions and/or the example operations of FIGS. 8-11 to implement the adaptive loop filter circuitry of FIG. 3.

FIG. 12 is a block diagram of an example processor platform 1200 structured to execute and/or instantiate the machine readable instructions and/or the operations of FIGS. 8-11 to implement the ALF circuitry 300 of FIG. 3. The processor platform 1200 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 1200 of the illustrated example includes processor circuitry 1212. The processor circuitry 1212 of the illustrated example is hardware. For example, the processor circuitry 1212 can be implemented by one or more integrated circuits, logic circuits, FPGAs, microprocessors, CPUs, GPUs, DSPs, and/or microcontrollers from any desired family or manufacturer. The processor circuitry 1212 may be implemented by one or more semiconductor based (e.g., silicon based) devices. In this example, the processor circuitry 1212 implements the machine learning circuitry 320 (identified by ML CIRCUITRY), the spatial variance determination circuitry (identified by SV DETERM CIRCUITRY), the clipping index set generation circuitry 340 (identified by CIS GENERATION CIRCUITRY), the clipping index set selection circuitry 350 (identified by CIS SELECTION CIRCUITRY), the clipping index adjustment circuitry 360 (CI ADJUSTMENT CIRCUITRY), and the filter circuitry 370 of FIG. 3.

The processor circuitry 1212 of the illustrated example includes a local memory 1213 (e.g., a cache, registers, etc.). The processor circuitry 1212 of the illustrated example is in communication with a main memory including a volatile memory 1214 and a non-volatile memory 1216 by a bus 1218. In some examples, the bus 1218 implements the bus 390 of FIG. 3. The volatile memory 1214 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1216 may be implemented by flash memory and/or any other desired type of memory device. Access to the main memory 1214, 1216 of the illustrated example is controlled by a memory controller 1217.

The processor platform 1200 of the illustrated example also includes interface circuitry 1220. In this example, the interface circuitry 1220 implements the interface circuitry 310 of FIG. 3. The interface circuitry 1220 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1222 are connected to the interface circuitry 1220. The input device(s) 1222 permit(s) a user to enter data and/or commands into the processor circuitry 1212. The input device(s) 1222 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1224 are also connected to the interface circuitry 1220 of the illustrated example. The output device(s) 1224 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1220 of the illustrated example, thus, typically includes a graphics driver card, a graphics driver chip, and/or graphics processor circuitry such as a GPU.

The interface circuitry 1220 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1226. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1200 of the illustrated example also includes one or more mass storage devices 1228 to store software and/or data. Examples of such mass storage devices 1228 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives. In this example, the one or more mass storage device 1228 implements the datastore 380, the machine learning model 382 (identified by ML MODEL), the clipping index set(s) 384, the coefficient(s) 386 (identified by COEFF(S)), and the filter(s) 388 of FIG. 3.

The machine executable instructions 1232, which may be implemented by the machine readable instructions of FIGS. 8-11, may be stored in the mass storage device 1228, in the volatile memory 1214, in the non-volatile memory 1216, and/or on a removable non-transitory computer readable storage medium such as a CD or DVD.

Figure 13:
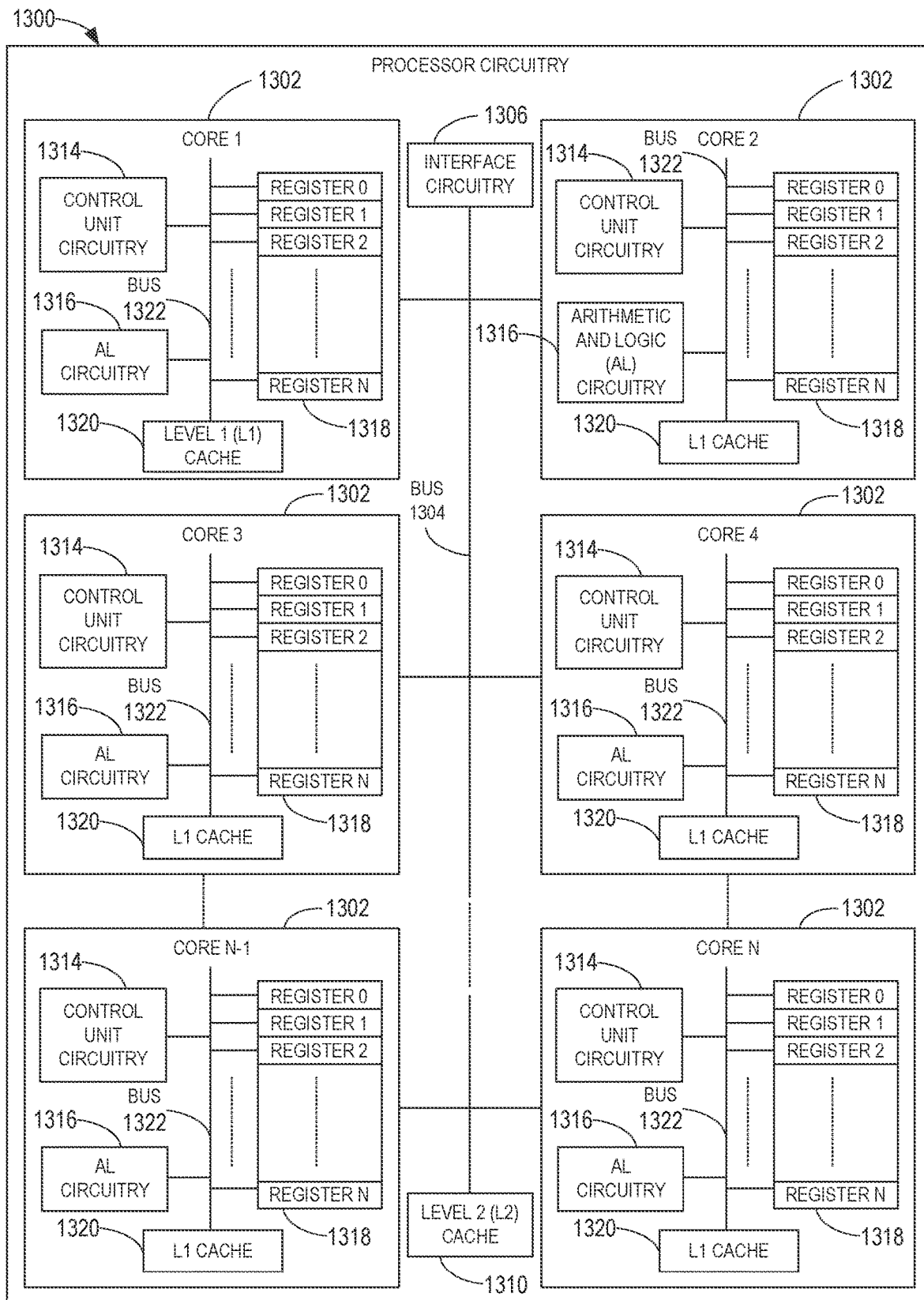
FIG. 13 is a block diagram of an example implementation of the processor circuitry of FIG. 12.

FIG. 13 is a block diagram of an example implementation of the processor circuitry 1212 of FIG. 12. In this example, the processor circuitry 1212 of FIG. 12 is implemented by a general purpose microprocessor 1300. The general purpose microprocessor circuitry 1300 executes some or all of the machine readable instructions of the flowcharts of FIGS. 8-11 to effectively instantiate the ALF circuitry 300 of FIG. 3 as logic circuits to perform the operations corresponding to those machine readable instructions. In some such examples, the ALF circuitry 300 of FIG. 3 is instantiated by the hardware circuits of the microprocessor 1300 in combination with the instructions. For example, the microprocessor 1300 may implement multi-core hardware circuitry such as a CPU, a DSP, a GPU, an XPU, etc. Although it may include any number of example cores 1302 (e.g., 1 core), the microprocessor 1300 of this example is a multi-core semiconductor device including N cores. The cores 1302 of the microprocessor 1300 may operate independently or may cooperate to execute machine readable instructions. For example, machine code corresponding to a firmware program, an embedded software program, or a software program may be executed by one of the cores 1302 or may be executed by multiple ones of the cores 1302 at the same or different times. In some examples, the machine code corresponding to the firmware program, the embedded software program, or the software program is split into threads and executed in parallel by two or more of the cores 1302. The software program may correspond to a portion or all of the machine readable instructions and/or operations represented by the flowcharts of FIGS. 8-11.

The cores 1302 may communicate by a first example bus 1304. In some examples, the first bus 1304 may implement a communication bus to effectuate communication associated with one(s) of the cores 1302. For example, the first bus 1304 may implement at least one of an Inter-Integrated Circuit (I2C) bus, a Serial Peripheral Interface (SPI) bus, a PCI bus, or a PCIe bus. Additionally or alternatively, the first bus 1304 may implement any other type of computing or electrical bus. The cores 1302 may obtain data, instructions, and/or signals from one or more external devices by example interface circuitry 1306. The cores 1302 may output data, instructions, and/or signals to the one or more external devices by the interface circuitry 1306. Although the cores 1302 of this example include example local memory 1320 (e.g., Level 1 (L1) cache that may be split into an L1 data cache and an L1 instruction cache), the microprocessor 1300 also includes example shared memory 1310 that may be shared by the cores (e.g., Level 2 (L2_cache)) for high-speed access to data and/or instructions. Data and/or instructions may be transferred (e.g., shared) by writing to and/or reading from the shared memory 1310. The local memory 1320 of each of the cores 1302 and the shared memory 1310 may be part of a hierarchy of storage devices including multiple levels of cache memory and the main memory (e.g., the main memory 1214, 1216 of FIG. 12). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1302 may be referred to as a CPU, DSP, GPU, etc., or any other type of hardware circuitry. Each core 1302 includes control unit circuitry 1314, arithmetic and logic (AL) circuitry (sometimes referred to as an ALU) 1316, a plurality of registers 1318, the L1 cache 1320, and a second example bus 1322. Other structures may be present. For example, each core 1302 may include vector unit circuitry, single instruction multiple data (SIMD) unit circuitry, load/store unit (LSU) circuitry, branch/jump unit circuitry, floating-point unit (FPU) circuitry, etc. The control unit circuitry 1314 includes semiconductor-based circuits structured to control (e.g., coordinate) data movement within the corresponding core 1302. The AL circuitry 1316 includes semiconductor-based circuits structured to perform one or more mathematic and/or logic operations on the data within the corresponding core 1302. The AL circuitry 1316 of some examples performs integer based operations. In other examples, the AL circuitry 1316 also performs floating point operations. In yet other examples, the AL circuitry 1316 may include first AL circuitry that performs integer based operations and second AL circuitry that performs floating point operations. In some examples, the AL circuitry 1316 may be referred to as an Arithmetic Logic Unit (ALU). The registers 1318 are semiconductor-based structures to store data and/or instructions such as results of one or more of the operations performed by the AL circuitry 1316 of the corresponding core 1302. For example, the registers 1318 may include vector register(s), SIMD register(s), general purpose register(s), flag register(s), segment register(s), machine specific register(s), instruction pointer register(s), control register(s), debug register(s), memory management register(s), machine check register(s), etc. The registers 1318 may be arranged in a bank as shown in FIG. 13. Alternatively, the registers 1318 may be organized in any other arrangement, format, or structure including distributed throughout the core 1302 to shorten access time. The second bus 1322 may implement at least one of an I2C bus, a SPI bus, a PCI bus, or a PCIe bus Each core 1302 and/or, more generally, the microprocessor 1300 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1300 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 14:
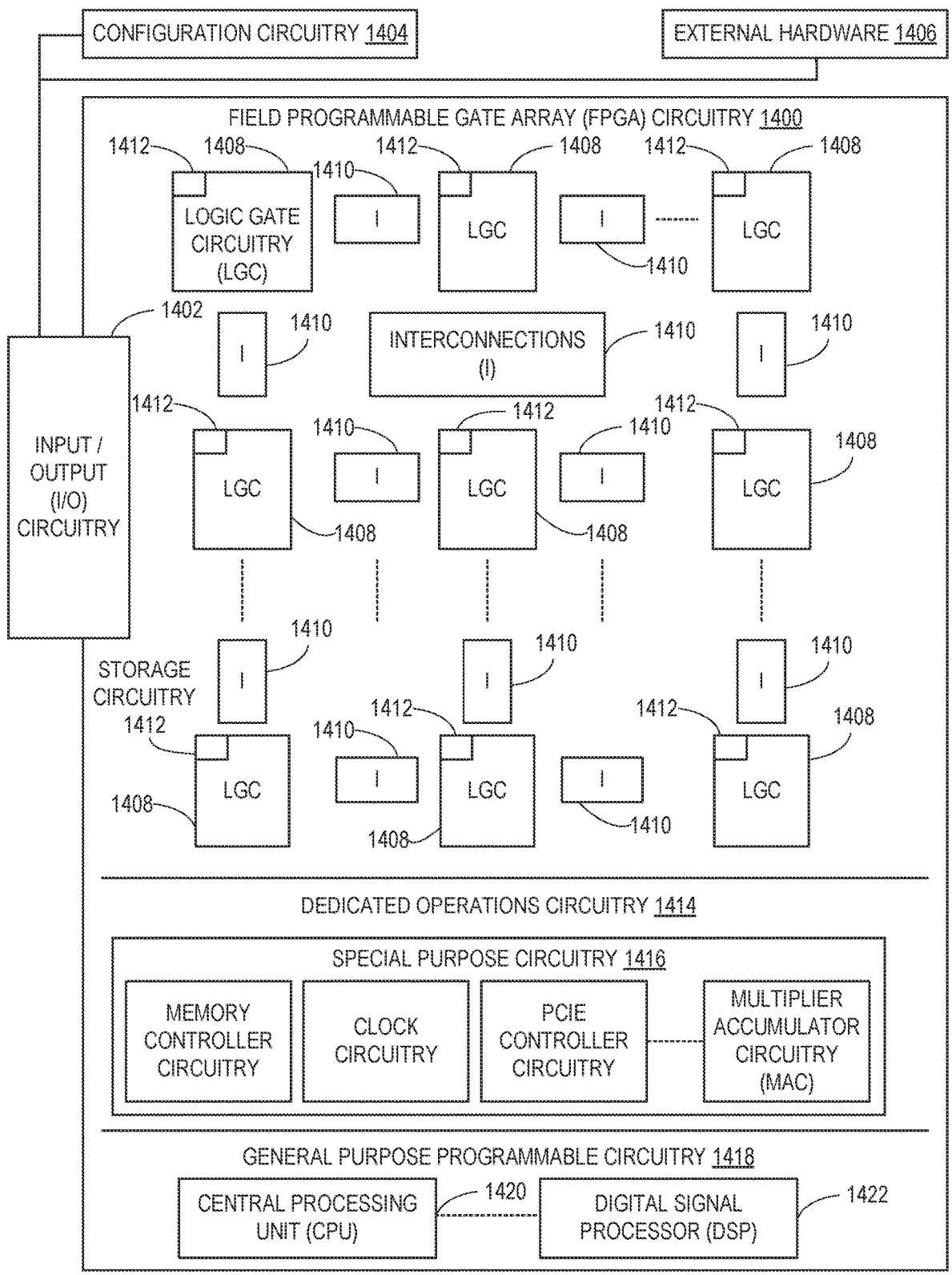
FIG. 14 is a block diagram of another example implementation of the processor circuitry of FIG. 12.

FIG. 14 is a block diagram of another example implementation of the processor circuitry 1212 of FIG. 12. In this example, the processor circuitry 1212 is implemented by FPGA circuitry 1400. The FPGA circuitry 1400 can be used, for example, to perform operations that could otherwise be performed by the example microprocessor 1300 of FIG. 13 executing corresponding machine readable instructions. However, once configured, the FPGA circuitry 1400 instantiates the machine readable instructions in hardware and, thus, can often execute the operations faster than they could be performed by a general purpose microprocessor executing the corresponding software.

More specifically, in contrast to the microprocessor 1300 of FIG. 13 described above (which is a general purpose device that may be programmed to execute some or all of the machine readable instructions represented by the flowcharts of FIGS. 8-11 but whose interconnections and logic circuitry are fixed once fabricated), the FPGA circuitry 1400 of the example of FIG. 14 includes interconnections and logic circuitry that may be configured and/or interconnected in different ways after fabrication to instantiate, for example, some or all of the machine readable instructions represented by the flowcharts of FIG. 8-11. In particular, the FPGA 1400 may be thought of as an array of logic gates, interconnections, and switches. The switches can be programmed to change how the logic gates are interconnected by the interconnections, effectively forming one or more dedicated logic circuits (unless and until the FPGA circuitry 1400 is reprogrammed). The configured logic circuits enable the logic gates to cooperate in different ways to perform different operations on data received by input circuitry. Those operations may correspond to some or all of the software represented by the flowcharts of FIGS. 8-11. As such, the FPGA circuitry 1400 may be structured to effectively instantiate some or all of the machine readable instructions of the flowcharts of FIGS. 8-11 as dedicated logic circuits to perform the operations corresponding to those software instructions in a dedicated manner analogous to an ASIC. Therefore, the FPGA circuitry 1400 may perform the operations corresponding to the some or all of the machine readable instructions of FIGS. 8-11 faster than the general purpose microprocessor can execute the same.

In the example of FIG. 14, the FPGA circuitry 1400 is structured to be programmed (and/or reprogrammed one or more times) by an end user by a hardware description language (HDL) such as Verilog. The FPGA circuitry 1400 of FIG. 14, includes example input/output (I/O) circuitry 1402 to obtain and/or output data to/from example configuration circuitry 1404 and/or external hardware (e.g., external hardware circuitry) 1406. For example, the configuration circuitry 1404 may implement interface circuitry that may obtain machine readable instructions to configure the FPGA circuitry 1400, or portion(s) thereof. In some such examples, the configuration circuitry 1404 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1406 may implement the microprocessor 1300 of FIG. 13. The FPGA circuitry 1400 also includes an array of example logic gate circuitry 1408, a plurality of example configurable interconnections 1410, and example storage circuitry 1412. The logic gate circuitry 1408 and interconnections 1410 are configurable to instantiate one or more operations that may correspond to at least some of the machine readable instructions of FIGS. 8-11 and/or other desired operations. The logic gate circuitry 1408 shown in FIG. 14 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1408 to enable configuration of the electrical structures and/or the logic gates to form circuits to perform desired operations. The logic gate circuitry 1408 may include other electrical structures such as look-up tables (LUTs), registers (e.g., flip-flops or latches), multiplexers, etc.

The interconnections 1410 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1408 to program desired logic circuits.

The storage circuitry 1412 of the illustrated example is structured to store result(s) of the one or more of the operations performed by corresponding logic gates. The storage circuitry 1412 may be implemented by registers or the like. In the illustrated example, the storage circuitry 1412 is distributed amongst the logic gate circuitry 1408 to facilitate access and increase execution speed.

The example FPGA circuitry 1400 of FIG. 14 also includes example Dedicated Operations Circuitry 1414. In this example, the Dedicated Operations Circuitry 1414 includes special purpose circuitry 1416 that may be invoked to implement commonly used functions to avoid the need to program those functions in the field. Examples of such special purpose circuitry 1416 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1400 may also include example general purpose programmable circuitry 1418 such as an example CPU 1420 and/or an example DSP 1422. Other general purpose programmable circuitry 1418 may additionally or alternatively be present such as a GPU, an XPU, etc., that can be programmed to perform other operations.

Although FIGS. 13 and 14 illustrate two example implementations of the processor circuitry 1212 of FIG. 12, many other approaches are contemplated. For example, as mentioned above, modern FPGA circuitry may include an on-board CPU, such as one or more of the example CPU 1420 of FIG. 14. Therefore, the processor circuitry 1212 of FIG. 12 may additionally be implemented by combining the example microprocessor 1300 of FIG. 13 and the example FPGA circuitry 1400 of FIG. 14. In some such hybrid examples, a first portion of the machine readable instructions represented by the flowcharts of FIGS. 8-11 may be executed by one or more of the cores 1302 of FIG. 13, a second portion of the machine readable instructions represented by the flowcharts of FIGS. 8-11 may be executed by the FPGA circuitry 1400 of FIG. 14, and/or a third portion of the machine readable instructions represented by the flowcharts of FIGS. 8-11 may be executed by an ASIC. It should be understood that some or all of the ALF circuitry 300 of FIG. 3 may, thus, be instantiated at the same or different times. Some or all of the circuitry may be instantiated, for example, in one or more threads executing concurrently and/or in series. Moreover, in some examples, some or all of the ALF circuitry 300 of FIG. 3 may be implemented within one or more virtual machines and/or containers executing on the microprocessor.

In some examples, the processor circuitry 1212 of FIG. 12 may be in one or more packages. For example, the processor circuitry 1300 of FIG. 13 and/or the FPGA circuitry 1400 of FIG. 14 may be in one or more packages. In some examples, an XPU may be implemented by the processor circuitry 1212 of FIG. 12, which may be in one or more packages. For example, the XPU may include a CPU in one package, a DSP in another package, a GPU in yet another package, and an FPGA in still yet another package.

Figure 15:
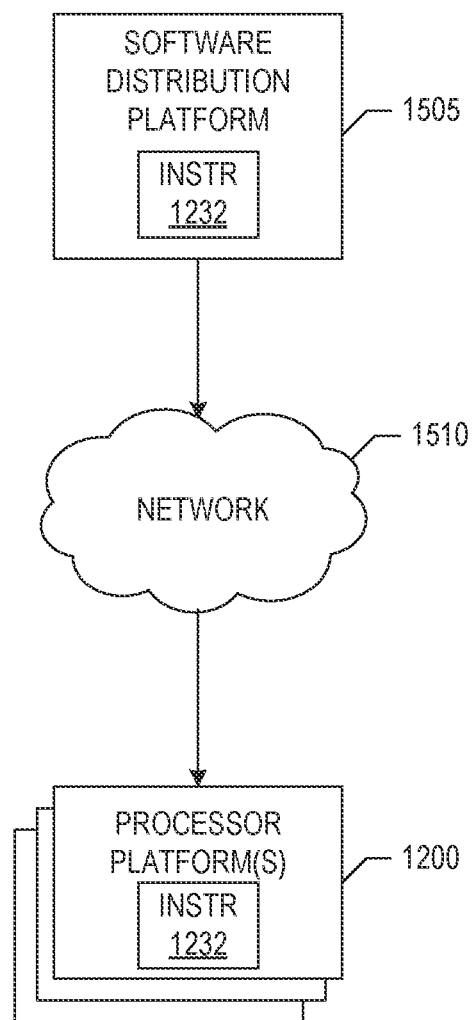
FIG. 15 is a block diagram of an example software distribution platform (e.g., one or more servers) to distribute software (e.g., software corresponding to the example machine readable instructions of FIGS. 8-11) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1505 to distribute software such as the example machine readable instructions 1232 of FIG. 12 to hardware devices owned and/or operated by third parties is illustrated in FIG. 15. The example software distribution platform 1505 may be implemented by any computer server, data facility, cloud service, etc., capable of storing and transmitting software to other computing devices. The third parties may be customers of the entity owning and/or operating the software distribution platform 1505. For example, the entity that owns and/or operates the software distribution platform 1505 may be a developer, a seller, and/or a licensor of software such as the example machine readable instructions 1232 of FIG. 12. The third parties may be consumers, users, retailers, OEMs, etc., who purchase and/or license the software for use and/or re-sale and/or sub-licensing. In the illustrated example, the software distribution platform 1505 includes one or more servers and one or more storage devices. The storage devices store the machine readable instructions 1232, which may correspond to the example machine readable instructions 800, 900, 1000, 1100 of FIGS. 8-11, as described above. The one or more servers of the example software distribution platform 1505 are in communication with a network 1510, which may correspond to any one or more of the Internet and/or any of the example networks 118, 1226 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 1232 from the software distribution platform 1505. For example, the software, which may correspond to the example machine readable instructions 1232 of FIG. 12, may be downloaded to the example processor platform 1200, which is to execute the machine readable instructions 1232 to implement the ALF circuitry 300 of FIG. 3. In some example, one or more servers of the software distribution platform 1505 periodically offer, transmit, and/or force updates to the software (e.g., the example machine readable instructions 1232 of FIG. 12) to ensure improvements, patches, updates, etc., are distributed and applied to the software at the end user devices.

From the foregoing, it will be appreciated that example systems, methods, apparatus, and articles of manufacture have been disclosed for clipping index identification in adaptive loop filtering for video encoding. Disclosed systems, methods, apparatus, and articles of manufacture improve the efficiency of using a computing device by selecting a clipping index set candidate from a set of clipping index set candidates that have a fixed pattern. For example, the total number of different clipping index sets can be less than or equal to a fixed number without respect to a number of different filters to be used. A low-complexity non-linear clipping index determination technique is disclosed to select a clipping index set candidate that has the highest priority from a pool of clipping index set candidates to achieve improved hardware, software, and/or firmware efficiency with respect to prior encoders. A high-quality non-linear clipping index determination technique is disclosed to select a clipping index set candidate from a pool of clipping index set candidates by executing a machine learning model to achieve improved visual quality with respect to prior encoders. Disclosed systems, methods, apparatus, and articles of manufacture are accordingly directed to one or more improvement(s) in the operation of a machine such as a computer or other electronic and/or mechanical device.

Example methods, apparatus, systems, and articles of manufacture for improved adaptive loop filtering are disclosed herein. Further examples and combinations thereof include the following:

Example 1 includes an apparatus to improve video encoding, the apparatus comprising at least one memory, instructions, and processor circuitry to at least one of execute or instantiate the instructions to generate a pool of clipping index set candidates by executing a machine learning model, select a clipping index set from the pool of the clipping index set candidates based on a rate distortion cost associated with the clipping index set, the clipping index set including clipping coefficients, and filter a video frame based on the clipping coefficients.

In Example 2, the subject matter of Example 1 can optionally include that the processor circuitry is to at least one of execute or instantiate the instructions to determine a spatial variance of the video frame, and in response to determining that the video frame is a smooth video frame based on the spatial variance, disable clipping for the video frame.

In Example 3, the subject matter of Examples 1-2 can optionally include that the processor circuitry is to at least one of execute or instantiate the instructions to determine whether the spatial variance satisfies a threshold, identify the video frame as a smooth video frame based on the spatial variance not satisfying the threshold, and determine that the video frame is not a smooth video frame based on the spatial variance satisfying the threshold.

In Example 4, the subject matter of Examples 1-3 can optionally include that the processor circuitry is to at least one of execute or instantiate the instructions to adjust a priority of the clipping index set based on the selection of the clipping index set for encoding the video frame.

In Example 5, the subject matter of Examples 1-4 can optionally include that the processor circuitry is to at least one of execute or instantiate the instructions to adjust the priority of the clipping index set by at least one of increasing the priority of the clipping index set or decreasing a respective priority of one or more of the pool of the clipping index set candidates not selected.

In Example 6, the subject matter of Examples 1-5 can optionally include that the processor circuitry is to at least one of execute or instantiate the instructions to select the clipping index set in response to determining that an encoder is configured to process numerous clipping index sets.

In Example 7, the subject matter of Examples 1-6 can optionally include that the clipping index set is a first clipping index set, the clipping index set candidates include the first clipping index set and a second clipping index set, and the processor circuitry is to at least one of execute or instantiate the instructions to generate a number of filters to filter the video frame based on the first clipping index set, adjust one or more first values of the clipping coefficients of the first clipping index set to one or more second values, determine a first rate distortion cost associated with the filters based on the one or more second values, and in response to determining that the first rate distortion cost is less than a second rate distortion cost associated with the second clipping index set, select the first clipping index set with the one or more second values.

In Example 8, the subject matter of Examples 1-7 can optionally include that the processor circuitry is to at least one of execute or instantiate the instructions to instantiate a machine learning model based on machine learning model parameters, execute the machine learning model to output a machine learning output, and in response to the machine learning output satisfying a threshold, deploy the machine learning model to generate the pool of the clipping index set candidates, assign a priority to respective ones of the pool of the clipping index set candidates, and store associations of the priorities and respective ones of the pool of the clipping index set candidates.

Example 9 includes an apparatus to improve video encoding, the apparatus comprising means for generating a pool of clipping index set candidates by executing a machine learning model, means for selecting a clipping index set from the pool of the clipping index set candidates based on a rate distortion cost associated with the clipping index set, the clipping index set including clipping coefficients, and means for filtering a video frame based on the clipping coefficients.

In Example 10, the subject matter of Example 9 can optionally include means for determining a spatial variance of the video frame, and the means for selecting is to, in response to determining that the video frame is a smooth video frame based on the spatial variance, disable clipping for the video frame.

In Example 11, the subject matter of Examples 9-10 can optionally include that the means for determining is to determine whether the spatial variance satisfies a threshold, identify the video frame as a smooth video frame based on the spatial variance not satisfying the threshold, and determine that the video frame is not a smooth video frame based on the spatial variance satisfying the threshold.

In Example 12, the subject matter of Examples 9-11 can optionally include means for adjusting to adjust a priority of the clipping index set based on the selection of the clipping index set for encoding the video frame.

In Example 13, the subject matter of Examples 9-12 can optionally include that the means for adjusting is to adjust the priority of the clipping index set by at least one of increasing the priority of the clipping index set or decreasing a respective priority of one or more of the pool of the clipping index set candidates not selected.

In Example 14, the subject matter of Examples 9-13 can optionally include that the means for selecting is to select the clipping index set in response to determining that an encoder is configured to process numerous clipping index sets.

In Example 15, the subject matter of Examples 9-14 can optionally include that the clipping index set is a first clipping index set, the clipping index set candidates include the first clipping index set and a second clipping index set, and wherein the means for filtering is to generate a number of filters to filter the video frame based on the first clipping index set, means for adjusting to adjust one or more first values of the clipping coefficients of the first clipping index set to one or more second values, and determine a first rate distortion cost associated with the filters based on the one or more second values, and the means for selecting to, in response to determining that the first rate distortion cost is less than a second rate distortion cost associated with the second clipping index set, select the first clipping index set with the one or more second values.

In Example 16, the subject matter of Examples 9-15 can optionally include means for executing a machine learning model, the means for executing to instantiate the machine learning model based on machine learning model parameters, execute the machine learning model to output a machine learning output, and in response to the machine learning output satisfying a threshold, deploy the machine learning model to generate the pool of the clipping index set candidates, assign a priority to respective ones of the pool of the clipping index set candidates, and store associations of the priorities and respective ones of the pool of the clipping index set candidates.

Example 17 includes at least one non-transitory computer readable storage medium comprising instructions that, when executed, cause processor circuitry to at least generate a pool of clipping index set candidates by executing a machine learning model, select a clipping index set from the pool of the clipping index set candidates based on a rate distortion cost associated with the clipping index set, the clipping index set including clipping coefficients, and filter a video frame based on the clipping coefficients.

In Example 18, the subject matter of Example 17 can optionally include that the instructions, when executed, cause the processor circuitry to determine a spatial variance of the video frame, and in response to determining that the video frame is a smooth video frame based on the spatial variance, disable clipping for the video frame.

In Example 19, the subject matter of Examples 17-18 can optionally include that the instructions, when executed, cause the processor circuitry to determine whether the spatial variance satisfies a threshold, identify the video frame as a smooth video frame based on the spatial variance not satisfying the threshold, and determine that the video frame is not a smooth video frame based on the spatial variance satisfying the threshold.

In Example 20, the subject matter of Examples 17-19 can optionally include that the instructions, when executed, cause the processor circuitry to adjust a priority of the clipping index set based on the selection of the clipping index set for encoding the video frame.

In Example 21, the subject matter of Examples 17-20 can optionally include that the instructions, when executed, cause the processor circuitry to adjust the priority of the clipping index set based on at least one of an increase of the priority of the clipping index set or a decrease of a respective priority of one or more of the pool of the clipping index set candidates not selected.

In Example 22, the subject matter of Examples 17-21 can optionally include that the instructions, when executed, cause the processor circuitry to select the clipping index set in response to a determination that an encoder is configured to process numerous clipping index sets.

In Example 23, the subject matter of Examples 17-22 can optionally include that the clipping index set is a first clipping index set, the clipping index set candidates include the first clipping index set and a second clipping index set, and the instructions, when executed, cause the processor circuitry to generate a number of filters to filter the video frame based on the first clipping index set, adjust one or more first values of the clipping coefficients of the first clipping index set to one or more second values, determine a first rate distortion cost associated with the filters based on the one or more second values, and in response to a determination that the first rate distortion cost is less than a second rate distortion cost associated with the second clipping index set, select the first clipping index set with the one or more second values.

In Example 24, the subject matter of Examples 17-23 can optionally include that the instructions, when executed, cause the processor circuitry to at least one of execute or instantiate the instructions to instantiate a machine learning model based on machine learning model parameters, execute the machine learning model to output a machine learning output, and in response to a determination that the machine learning output satisfies a threshold, execute the machine learning model to generate the pool of the clipping index set candidates, assign a priority to respective ones of the pool of the clipping index set candidates, and store associations of the priorities and respective ones of the pool of the clipping index set candidates.

Example 25 includes a method to improve video encoding, the method comprising generating a pool of clipping index set candidates by executing a machine learning model, selecting a clipping index set from the pool of the clipping index set candidates based on a rate distortion cost associated with the clipping index set, the clipping index set including clipping coefficients, and filtering a video frame based on the clipping coefficients.

In Example 26, the subject matter of Example 25 can optionally include determining a spatial variance of the video frame, and in response to determining that the video frame is a smooth video frame based on the spatial variance, disabling clipping for the video frame.

In Example 27, the subject matter of Examples 25-26 can optionally include determining whether the spatial variance satisfies a threshold, identifying the video frame as a smooth video frame based on the spatial variance not satisfying the threshold, and determining that the video frame is not a smooth video frame based on the spatial variance satisfying the threshold.

In Example 28, the subject matter of Examples 25-27 can optionally include adjusting a priority of the clipping index set based on the selection of the clipping index set for encoding the video frame.

In Example 29, the subject matter of Examples 25-28 can optionally include that the adjusting the priority of the clipping index set includes increasing the priority of the clipping index set, and further including decreasing a respective priority of one or more of the pool of the clipping index set candidates not selected.

In Example 30, the subject matter of Examples 25-29 can optionally include that the clipping index set is selected in response to determining that an encoder is configured to process numerous clipping index sets.

In Example 31, the subject matter of Examples 25-30 can optionally include that the clipping index set is a first clipping index set, the clipping index set candidates include the first clipping index set and a second clipping index set, and further including generating a number of filters to filter the video frame based on the first clipping index set, adjusting one or more first values of the clipping coefficients of the first clipping index set to one or more second values, determining a first rate distortion cost associated with the filters based on the one or more second values, and in response to determining that the first rate distortion cost is less than a second rate distortion cost associated with the second clipping index set, selecting the first clipping index set with the one or more second values.

In Example 32, the subject matter of Examples 25-31 can optionally include instantiating a machine learning model based on machine learning model parameters, executing the machine learning model to output a machine learning output, and in response to the machine learning output satisfying a threshold, deploying the machine learning model to generate the pool of the clipping index set candidates, assign a priority to respective ones of the pool of the clipping index set candidates, and store associations of the priorities and respective ones of the pool of the clipping index set candidates.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus to improve video encoding, the apparatus comprising:
    at least one memory;
    instructions; and
    processor circuitry to at least one of execute or instantiate the instructions to:
        generate a pool of clipping index set candidates by executing a machine learning model;
        select a clipping index set from the pool of the clipping index set candidates based on a rate distortion cost associated with the clipping index set, the clipping index set including clipping coefficients; and
        filter a video frame based on the clipping coefficients.

2. The apparatus of claim 1, wherein the processor circuitry is to at least one of execute or instantiate the instructions to:
    determine a spatial variance of the video frame; and
    in response to determining that the video frame is a smooth video frame based on the spatial variance, disable clipping for the video frame.

3. The apparatus of claim 2, wherein the processor circuitry is to at least one of execute or instantiate the instructions to:
    determine whether the spatial variance satisfies a threshold;
    identify the video frame as a smooth video frame based on the spatial variance not satisfying the threshold; and
    determine that the video frame is not a smooth video frame based on the spatial variance satisfying the threshold.

4. The apparatus of claim 1, wherein the processor circuitry is to at least one of execute or instantiate the instructions to adjust a priority of the clipping index set based on the selection of the clipping index set for encoding the video frame.

5. The apparatus of claim 4, wherein the processor circuitry is to at least one of execute or instantiate the instructions to adjust the priority of the clipping index set by at least one of increasing the priority of the clipping index set or decreasing a respective priority of one or more of the pool of the clipping index set candidates not selected.

6. The apparatus of claim 1, wherein the processor circuitry is to at least one of execute or instantiate the instructions to select the clipping index set in response to determining that an encoder is configured to process numerous clipping index sets.

7. The apparatus of claim 1, wherein the clipping index set is a first clipping index set, the pool of the clipping index set candidates include the first clipping index set and a second clipping index set, and the processor circuitry is to at least one of execute or instantiate the instructions to:
    generate a number of filters to filter the video frame based on the first clipping index set;
    adjust one or more first values of the clipping coefficients of the first clipping index set to one or more second values;
    determine a first rate distortion cost associated with the filters based on the one or more second values; and
    in response to determining that the first rate distortion cost is less than a second rate distortion cost associated with the second clipping index set, select the first clipping index set with the one or more second values.

8. The apparatus of claim 1, wherein the processor circuitry is to at least one of execute or instantiate the instructions to:
    instantiate a machine learning model based on machine learning model parameters;
    execute the machine learning model to output a machine learning output; and
    in response to the machine learning output satisfying a threshold, deploy the machine learning model to:
        generate the pool of the clipping index set candidates;
        assign a priority to respective ones of the pool of the clipping index set candidates; and
        store associations of the priorities and respective ones of the pool of the clipping index set candidates.

9. An apparatus to improve video encoding, the apparatus comprising:
    means for generating a pool of clipping index set candidates by executing a machine learning model;
    means for selecting a clipping index set from the pool of the clipping index set candidates based on a rate distortion cost associated with the clipping index set, the clipping index set including clipping coefficients; and
    means for filtering a video frame based on the clipping coefficients.

10. The apparatus of claim 9, further including:
    means for determining a spatial variance of the video frame; and
    the means for selecting is to, in response to determining that the video frame is a smooth video frame based on the spatial variance, disable clipping for the video frame.

11. The apparatus of claim 10, wherein the means for determining is to:
    determine whether the spatial variance satisfies a threshold;
    identify the video frame as a smooth video frame based on the spatial variance not satisfying the threshold; and
    determine that the video frame is not a smooth video frame based on the spatial variance satisfying the threshold.

12. The apparatus of claim 9, further including means for adjusting to adjust a priority of the clipping index set based on the selection of the clipping index set for encoding the video frame.

13. The apparatus of claim 12, wherein the means for adjusting is to adjust the priority of the clipping index set by at least one of increasing the priority of the clipping index set or decreasing a respective priority of one or more of the pool of the clipping index set candidates not selected.

14. The apparatus of claim 9, wherein the means for selecting is to select the clipping index set in response to determining that an encoder is configured to process numerous clipping index sets.

15. The apparatus of claim 9, wherein the clipping index set is a first clipping index set, the pool of the clipping index set candidates include the first clipping index set and a second clipping index set, and wherein:
the means for filtering is to generate a number of filters to filter the video frame based on the first clipping index set;
means for adjusting to:
adjust one or more first values of the clipping coefficients of the first clipping index set to one or more second values; and
determine a first rate distortion cost associated with the filters based on the one or more second values; and
the means for selecting to, in response to determining that the first rate distortion cost is less than a second rate distortion cost associated with the second clipping index set, select the first clipping index set with the one or more second values.

16. The apparatus of claim 9, further including means for executing a machine learning model, the means for executing to:
instantiate the machine learning model based on machine learning model parameters;
execute the machine learning model to output a machine learning output; and
in response to the machine learning output satisfying a threshold, deploy the machine learning model to:
generate the pool of the clipping index set candidates;
assign a priority to respective ones of the pool of the clipping index set candidates; and
store associations of the priorities and respective ones of the pool of the clipping index set candidates.

17. At least one non-transitory computer readable storage medium comprising instructions that, when executed, cause processor circuitry to at least:
generate a pool of clipping index set candidates by executing a machine learning model;
select a clipping index set from the pool of the clipping index set candidates based on a rate distortion cost associated with the clipping index set, the clipping index set including clipping coefficients; and
filter a video frame based on the clipping coefficients.

18. The at least one non-transitory computer readable storage medium of claim 17, wherein the instructions, when executed, cause the processor circuitry to:
determine a spatial variance of the video frame; and
in response to determining that the video frame is a smooth video frame based on the spatial variance, disable clipping for the video frame.

19. The at least one non-transitory computer readable storage medium of claim 18, wherein the instructions, when executed, cause the processor circuitry to:
determine whether the spatial variance satisfies a threshold;
identify the video frame as a smooth video frame based on the spatial variance not satisfying the threshold; and
determine that the video frame is not a smooth video frame based on the spatial variance satisfying the threshold.

20. The at least one non-transitory computer readable storage medium of claim 17, wherein the instructions, when executed, cause the processor circuitry to adjust a priority of the clipping index set based on the selection of the clipping index set for encoding the video frame.

21. The at least one non-transitory computer readable storage medium of claim 20, wherein the instructions, when executed, cause the processor circuitry to adjust the priority of the clipping index set based on at least one of an increase of the priority of the clipping index set or a decrease of a respective priority of one or more of the pool of the clipping index set candidates not selected.

22. The at least one non-transitory computer readable storage medium of claim 17, wherein the instructions, when executed, cause the processor circuitry to select the clipping index set in response to a determination that an encoder is configured to process numerous clipping index sets.

23. The at least one non-transitory computer readable storage medium of claim 17, wherein the clipping index set is a first clipping index set, the clipping index set candidates include the first clipping index set and a second clipping index set, and the instructions, when executed, cause the processor circuitry to:
generate a number of filters to filter the video frame based on the first clipping index set;
adjust one or more first values of the clipping coefficients of the first clipping index set to one or more second values;
determine a first rate distortion cost associated with the filters based on the one or more second values; and
in response to a determination that the first rate distortion cost is less than a second rate distortion cost associated with the second clipping index set, select the first clipping index set with the one or more second values.

24. The at least one non-transitory computer readable storage medium of claim 17, wherein the instructions, when executed, cause the processor circuitry to at least one of execute or instantiate the instructions to:
instantiate a machine learning model based on machine learning model parameters;
execute the machine learning model to output a machine learning output; and
in response to a determination that the machine learning output satisfies a threshold, execute the machine learning model to:
generate the pool of the clipping index set candidates;
assign a priority to respective ones of the pool of the clipping index set candidates; and
store associations of the priorities and respective ones of the pool of the clipping index set candidates.

\* \* \* \* \*